(12) United States Patent
Spengler

(10) Patent No.: US 12,138,730 B2
(45) Date of Patent: Nov. 12, 2024

(54) DEVICE FOR SUPPORTING AND/OR GUIDING A MACHINE TOOL

(71) Applicant: Festool GmbH, Wendlingen (DE)

(72) Inventor: Wolfgang Spengler, Neidlingen (DE)

(73) Assignee: Festool GmbH, Wendlingen (DE)

( * ) Notice: Subject to any disclaimer, the term of this patent is extended or adjusted under 35 U.S.C. 154(b) by 898 days.

(21) Appl. No.: 17/260,480

(22) PCT Filed: Jul. 19, 2019

(86) PCT No.: PCT/EP2019/069598
§ 371 (c)(1),
(2) Date: Jan. 14, 2021

(87) PCT Pub. No.: WO2020/016446
PCT Pub. Date: Jan. 23, 2020

(65) Prior Publication Data
US 2021/0268619 A1    Sep. 2, 2021

(30) Foreign Application Priority Data

Jul. 20, 2018 (DE) .......................... 102018117677.5

(51) Int. Cl.
*B23Q 9/00* (2006.01)
*B25H 1/00* (2006.01)

(52) U.S. Cl.
CPC ......... *B23Q 9/0042* (2013.01); *B25H 1/0078* (2013.01)

(58) Field of Classification Search
CPC .... B23Q 9/0042; B23Q 9/005; B23Q 9/0014; B25H 1/0078; Y10T 83/68;
(Continued)

(56) References Cited

U.S. PATENT DOCUMENTS

| 5,136,910 A | 8/1992 | Kuhn et al. |
| 9,649,695 B1 | 5/2017 | Smith |

(Continued)

FOREIGN PATENT DOCUMENTS

| AR | 067200 A1 | 10/2009 |
| CN | 101301694 A | 11/2008 |

(Continued)

OTHER PUBLICATIONS

DE3807516 Translation (Year: 1989).*
DE17260480 Translation (Year: 2013).*
Chinese Office Action of Aug. 25, 2022.

*Primary Examiner* — Jonathan G Riley
(74) *Attorney, Agent, or Firm* — Hoffmann & Baron, LLP

(57) ABSTRACT

A device for supporting and/or guiding a machine tool or a workpiece, wherein the device includes a contact body having a contact surface for contact on a work surface of a workpiece or a wall. It is provided that the contact body includes a holding element having an adhesive means for adhesion to the work surface, wherein the adhesive means, when the contact surface of the contact body bears against the work surface, can be brought from a positioning state, in which the adhesive means is not in contact with the work surface and the contact surface can be positioned with respect to the work surface into an adhesive state, in which the adhesive means adheres to the work surface and fixes the contact body on the work surface.

49 Claims, 7 Drawing Sheets

(58) Field of Classification Search
CPC ... Y10T 83/8763; Y10T 83/863; B23D 47/02; B23D 59/00; B27B 9/04
See application file for complete search history.

(56) References Cited

U.S. PATENT DOCUMENTS

| | | |
|---|---|---|
| 2003/0116331 A1 | 6/2003 | Boyl-Davis et al. |
| 2009/0064510 A1 | 3/2009 | Niwa et al. |
| 2016/0297041 A1 | 10/2016 | Fitzmaurice et al. |

FOREIGN PATENT DOCUMENTS

| | | | | |
|---|---|---|---|---|
| CN | 101380744 A | 3/2009 | | |
| CN | 101758288 A | 6/2010 | | |
| CN | 101931285 A | 12/2010 | | |
| CN | 102554640 A | 7/2012 | | |
| CN | 205996303 U | 3/2017 | | |
| DE | 36 12 214 A1 | 10/1987 | | |
| DE | 3807516 C1 * | 6/1989 | | |
| DE | 101 49 395 A1 | 4/2003 | | |
| DE | 102007009641 | 8/2008 | | |
| DE | 102008031077 A1 | 1/2010 | | |
| DE | 10 2008 059 838 A1 | 6/2010 | | |
| DE | 102009029108 A1 | 3/2011 | | |
| DE | 202013104555 | 10/2013 | | |
| DE | 102013209482 | 11/2014 | | |
| DE | 102013209482 A1 * | 11/2014 | ............ | B23D 59/00 |
| DE | 202016003907 | 9/2017 | | |
| EP | 2974824 A2 | 1/2016 | | |
| JP | 5-104501 A | 4/1993 | | |

* cited by examiner

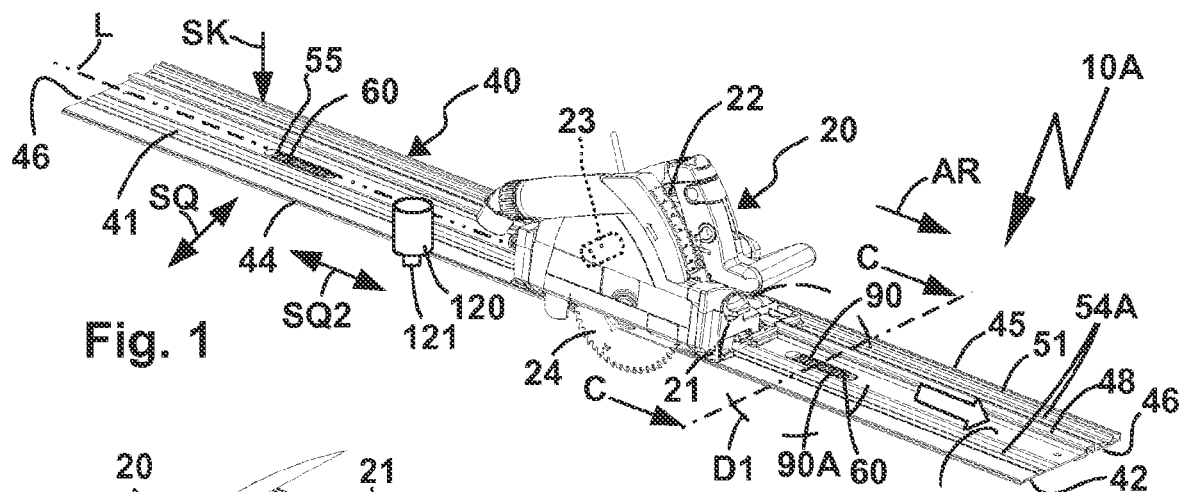

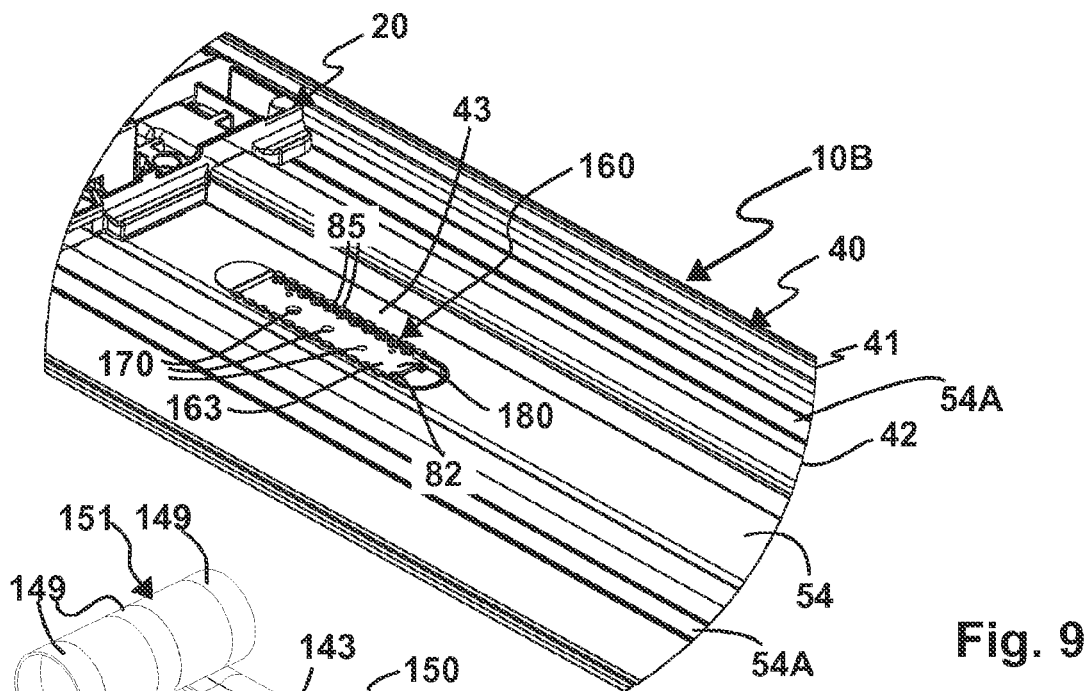
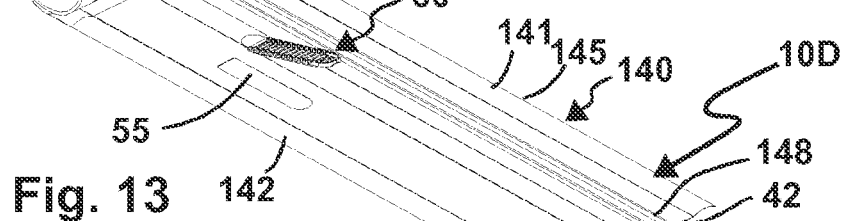
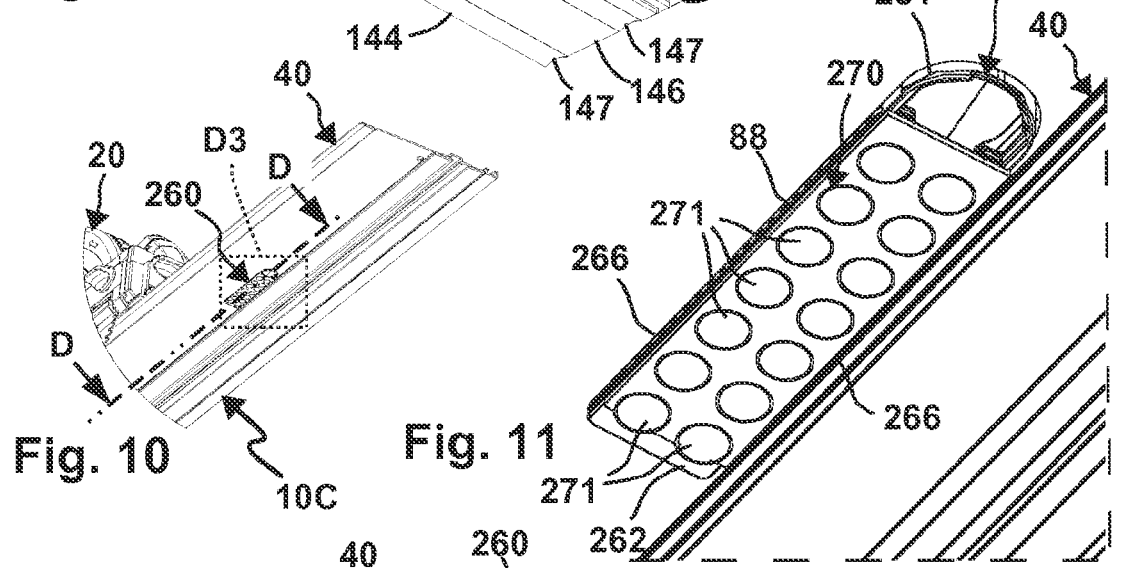
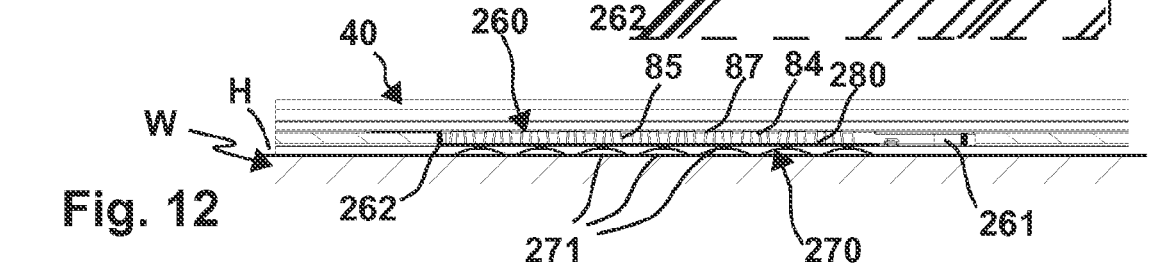

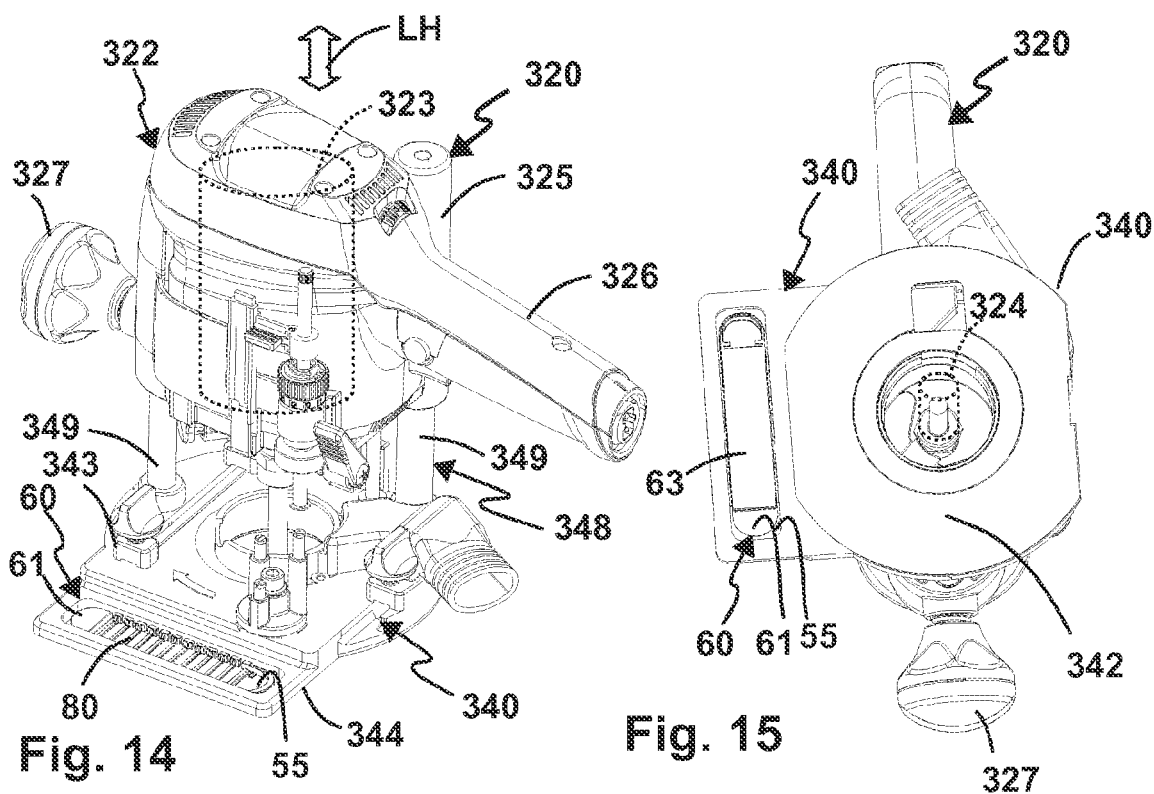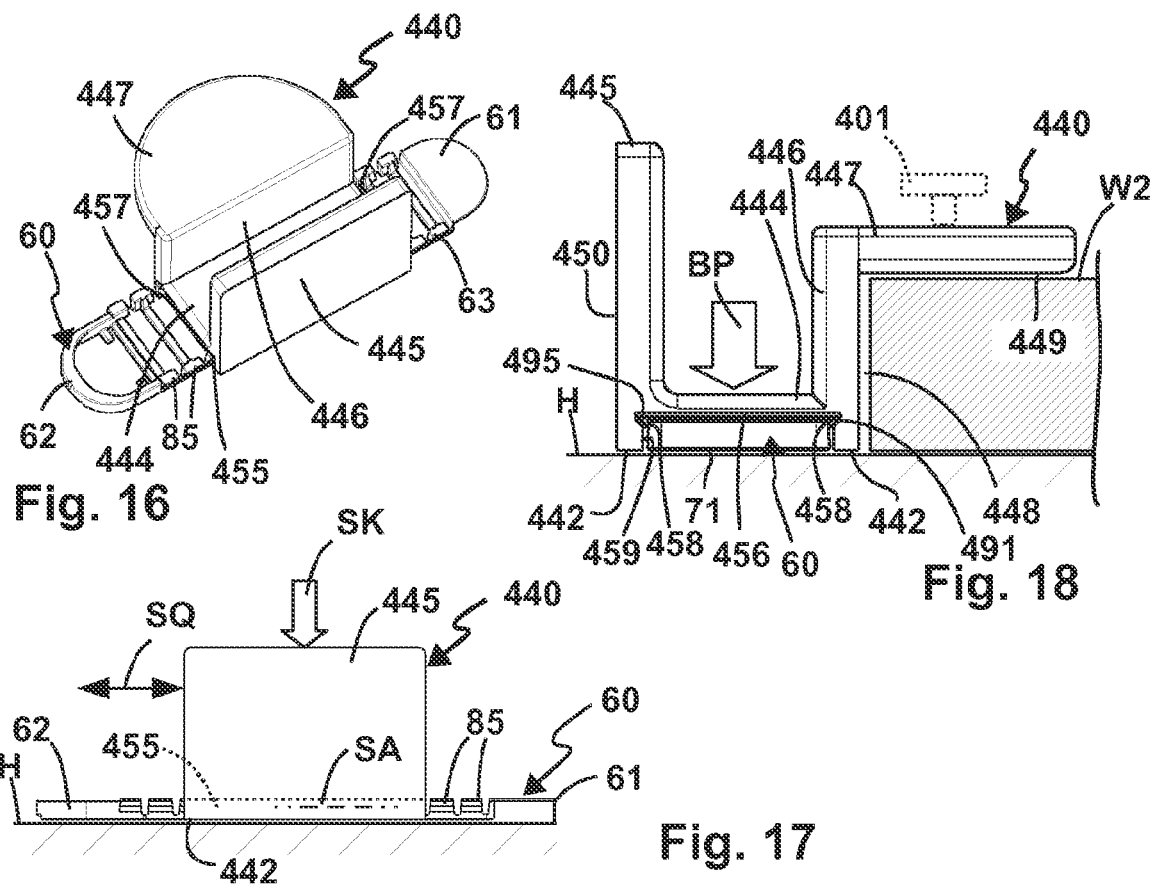

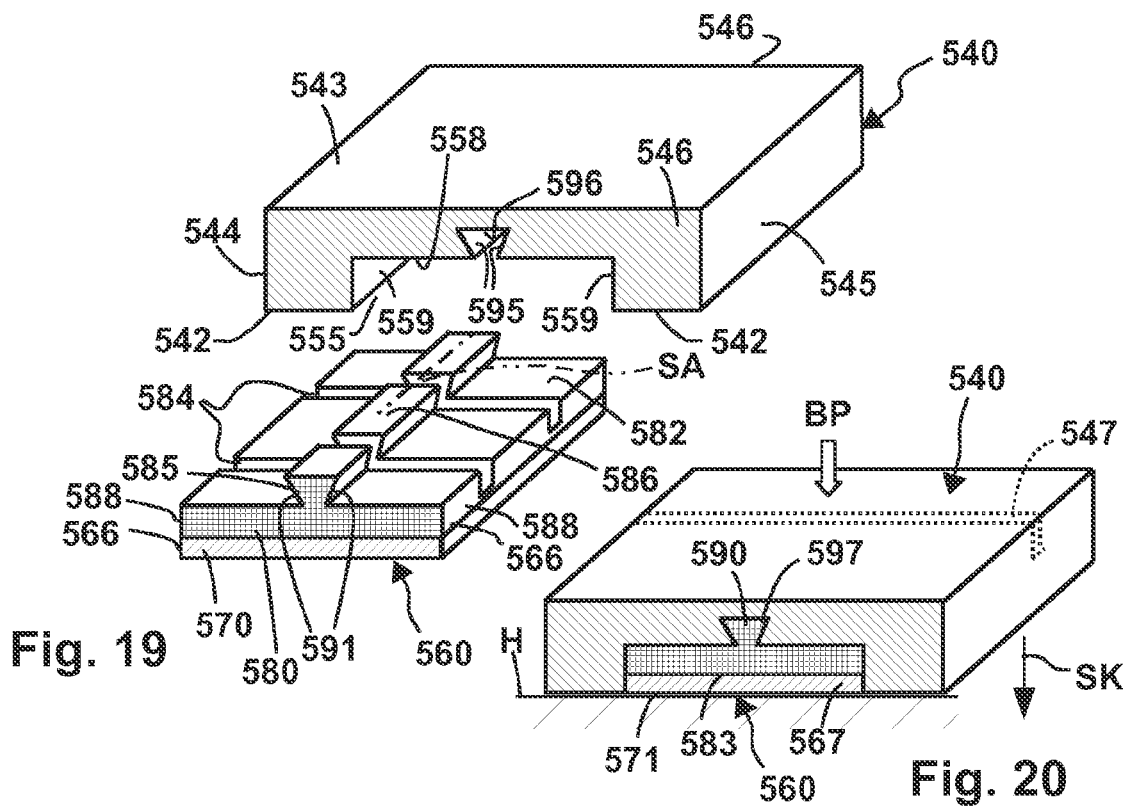
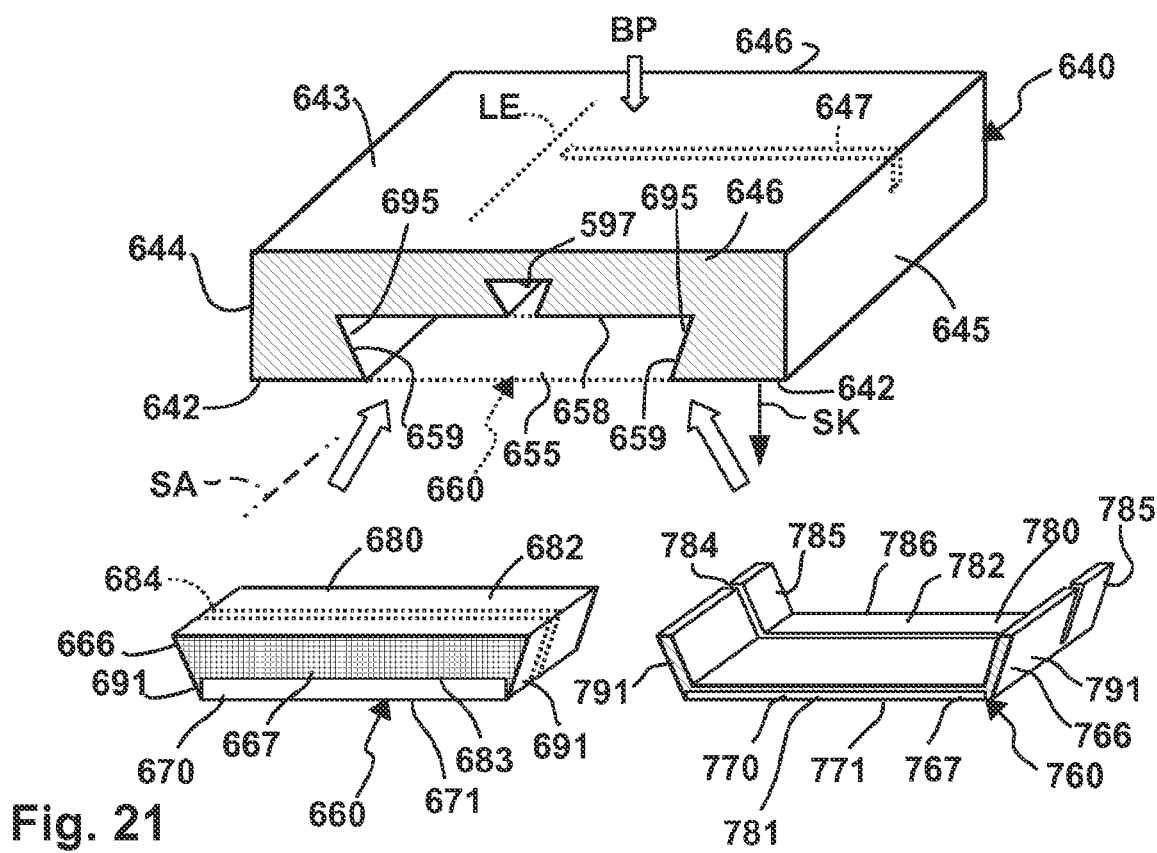

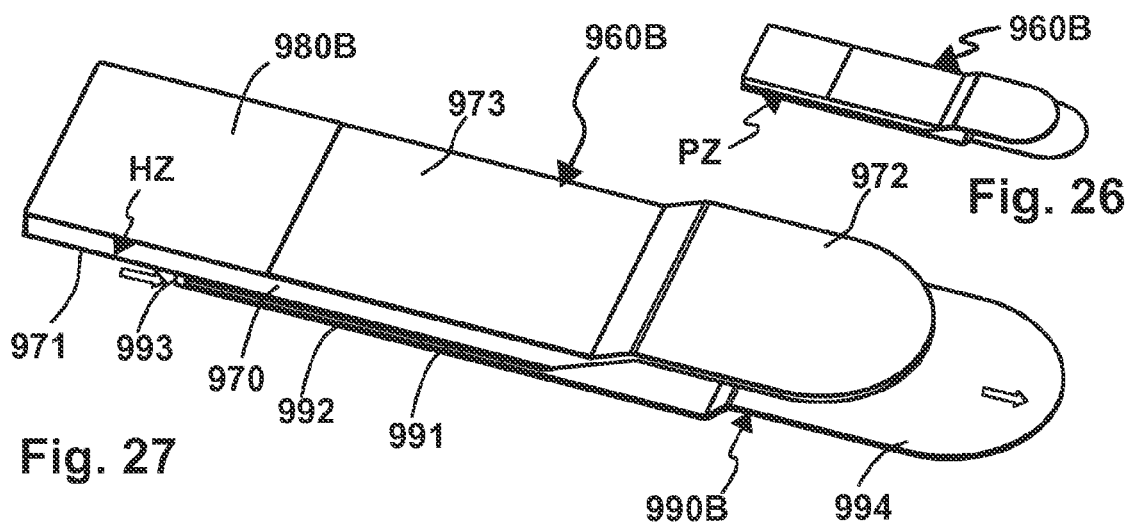
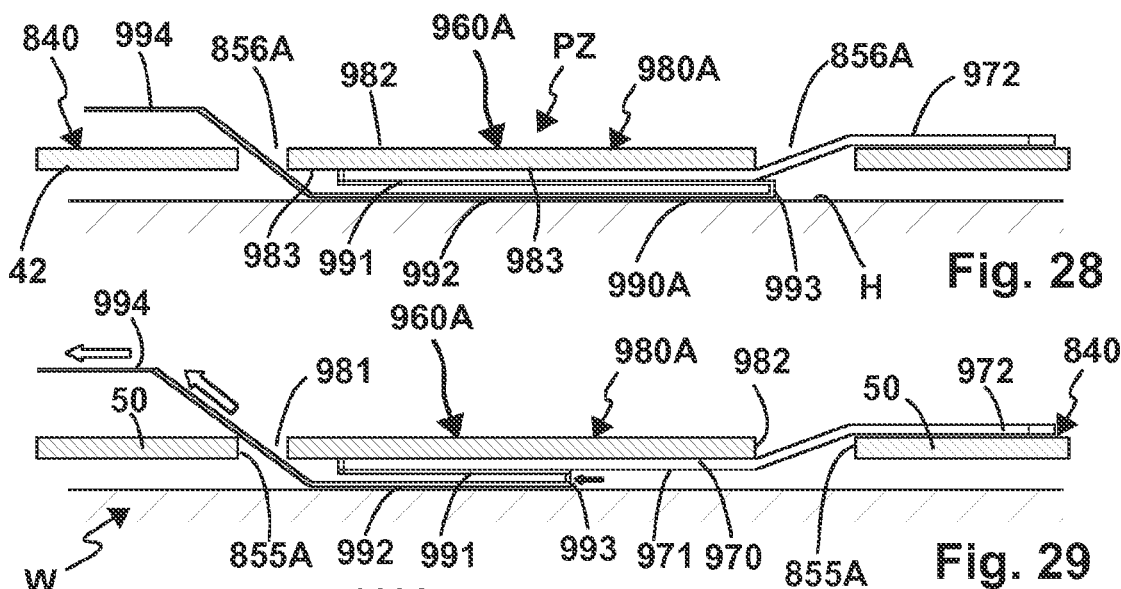
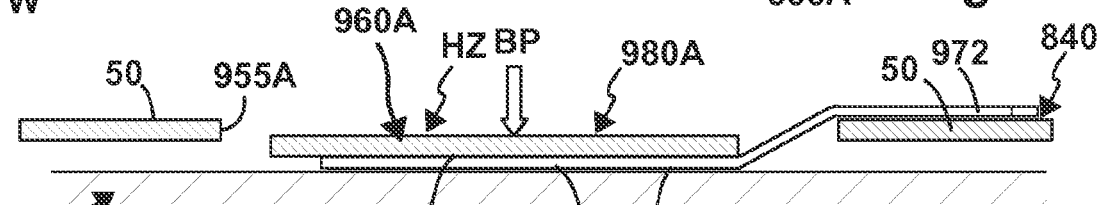
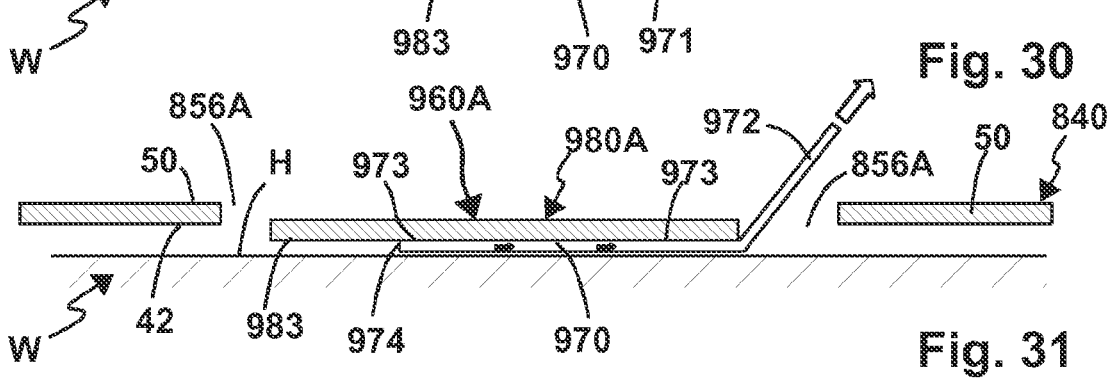

DEVICE FOR SUPPORTING AND/OR GUIDING A MACHINE TOOL

This application claims priority based on an International Application filed under the Patent Cooperation Treaty, PCT/EP2019/069598, filed Jul. 19, 2019, which claims priority to DE 102018117677.3, filed Jul. 20, 2018.

BACKGROUND OF THE INVENTION

The invention relates to a device for supporting and/or guiding a machine tool or a tool or a workpiece, wherein the device includes a contact body having a contact surface for contact on a work surface of a workpiece or a wall.

A contact body in the form of a guide rail, along which a handheld machine tool can be guided, is explained, for example, in DE 10 2008 059 838 A1. The guide rail is placed loosely on the workpiece, so to speak, wherein frictional components, for example rubber elements or the like, are arranged on its lower side so that the guide rail remains more or less in place.

A guide rail which is held magnetically on the workpiece is known from DE 20 2013 104 555 U1 A further guide rail is explained in DE 10 2013 209 482 A1. A round hole gauge is described in DE 20 2016 003 907 U1. DE 10 2007 009 641 A1 relates to a device for guiding a milling tool having suction heads.

However, such handling is not sufficient for exact workpiece machining, for example for a saw cut. The guide rail can then be screwed to the underlying surface, for example, or a nail can be driven through the guide rail, for which the guide rail shown in DE 10 2008 059 838 A1 has, for example, a hole at each of its front and rear longitudinal ends. The handling is accordingly difficult. In addition, the workpiece is damaged by the nails or screws for fastening the guide rail.

SUMMARY OF THE INVENTION

It is therefore the object of the present invention to provide an improved device for supporting and/or guiding a machine tool or a workpiece.

To achieve the object, it is provided in a device of the type mentioned at the outset that the contact body includes a holding element having an adhesive means for adhesion on the work surface, wherein, when the contact surface of the contact body bears against the work surface, the adhesive means can be brought from a positioning state, in which the adhesive means means is not in contact with the work surface and the contact surface can be positioned with respect to the work surface, into an adhesive state, in which the adhesive means adheres to the work surface and fixes the contact body on the work surface.

It is a basic concept of the present invention that the holding element detachably fixes the contact body to the workpiece, for which purpose an adhesive means is provided which can be removed from the work surface again, in particular without leaving any residue, without damaging the work surface. Thus, for example, sensitive workpieces can be processed. Nevertheless, the contact body has a firm hold on the work surface, as a result of which, for example, a machine tool, for example a saw, a router, or the like, can be better positioned relative to the workpiece, for example can be fixed.

In the adhesive state, the adhesive means is preferably in one plane with the contact surface or protrudes in front of the contact surface.

An adhesive surface of the adhesive means and the contact surface are preferably parallel and/or in one plane when the adhesive means is in the adhesive state.

It is obvious that the device can include not just one holding element, but multiple, for example two or three, holding elements. The holding elements are arranged one behind the other, for example, in a working direction along which the tool can be guided along the contact body. It is obvious that holding element receptacles can be provided on the contact body not only for one holding element but for multiple, for example two or three, holding elements. The holding elements are arranged one behind the other, for example, in a working direction along which a tool can be guided along the contact body.

The holding element preferably has a plate-like or disk-like shape.

The holding element is preferably strip-shaped and/or has an oblong shape.

The holding element as a whole or at least one component of the holding element, for example a carrier body of the holding element, the adhesive means, or the like, preferably consists of plastic and/or is compostable or biodegradable.

The contact body preferably consists of metal, in particular aluminum. The contact body is preferably a profile body and/or an extrusion profile.

The holding element advantageously has straight longitudinal sides that extend in parallel. For example, the holding element is rectangular in a top view. At one or both longitudinal ends, however, the longitudinal sides can also be connected to one another via a rounded section, in particular a tab section or handle section. It is obvious that other outer circumferential geometries, for example round, oval, or polygonal holding elements, are easily possible.

Multiple alternative and additional variations come into consideration for the design of the adhesive means. For example, the adhesive means has an adhesive bonding surface for the adhesive bonding to the work surface. The adhesive means can also include a suction section or a suction contour. For example, the adhesive means can also comprise a suction head, in particular an arrangement of multiple suction heads, for suction on the work surface. The suction heads can be arranged adjacent to one another. In principle, it is also possible that the adhesive means comprises a hook-and-loop layer or is formed thereby. It is also possible for one adhesive bonding surface to be segmented or for multiple adhesive bonding surfaces to be present.

The adhesive means can be designed to adhere to rough surfaces, for example wooden materials, stone, or the like. For this purpose, the adhesive means preferably has an adhesive bonding agent or an adhesive bonding surface. However, it is also advantageous if the adhesive means can adhere to smooth surfaces, for example tiles, glass, or the like. An adhesive means having an adhesive bonding surface can also be provided here, but also having a suction surface, in particular a suction head.

The adhesive bonding, i.e., the design of the adhesive bonding surface, is preferably such that the adhesive bonding agent can be removed from the work surface without leaving any residue. The adhesive means preferably includes an adhesive bonding strip or an adhesive bonding layer. For example, the adhesive means is formed by an adhesive agent that can be removed without leaving any residue, as described, for example, in WO 92/11332 A1 or in the references mentioned therein. In particular, it is advantageous if the adhesive agent does not enable a permanent adhesive bond, but a detachable adhesive bond, as is known, for example, in connection with sticky notes that are removable without leaving any residue and easily from the underlying surface. In the present case, of course, the adhesive bond is preferably somewhat stronger, that is to say that it is somewhat more difficult to detach the adhesive bond. Nevertheless, the adhesive means is preferably designed such that it can be removed from the work surface without leaving any residue. The adhesive means is preferably a so-called foam adhesive agent.

The adhesive means comprises, for example, an acrylate compound. For example, a modified acrylate compound is advantageous for the adhesion of the adhesive means to a carrier body of the holding element or directly to the contact body, so that the holding element adheres strongly to the carrier body. The adhesive means advantageously comprises a so-called pure acrylate compound on its side provided for the adhesion to the work surface. This pure acrylate compound can be removed from the work surface without leaving any residue.

The adhesive means or the holding element as a whole can be a sandwich adhesive means and/or include multiple layers, for example layers made up of different acrylate compounds, for example a modified acrylate compound and a pure acrylate compound. Furthermore, a reinforcing film, in particular made of polyurethane, PET, or the like, and/or a foam layer, in particular made of polyurethane foam, can be provided in the adhesive means or the holding element.

The work surface is, for example, a workpiece surface, for example of a wooden workpiece, a plastic workpiece, or the like. However, adhering to a wall, for example a building wall or room wall, can also be readily implemented in this way.

Basically it is the case that in the positioning state, the contact body can still be displaced or adjusted readily on the surface, i.e., the adhesive means is more or less inactive. The positioning state can also be referred to as an inactive state or an inactivation state of the adhesive means. However, when the suitable position of the contact body relative to the work surface is reached, the adhesive means is more or less activated or brought into an activation state. The adhesive means is therefore brought into an adhesive state in which the adhesive means adheres to the work surface and is therefore not only fixed on the work surface, but also fixes the contact body on the work surface.

To adjust or bring the holding element from the positioning state into the adhesive state, multiple options are advantageous:

For example, it can be provided that the holding element is arranged on a part of the contact body that is movable, for example pivotable, slidable, or the like, with respect to the contact surface, so that the adhesive means is adjustable from the positioning state to the adhesive state by actuating the movable part. The movable part can also be a flexible part of the contact body, however. For example, a flexible section or projection on which the adhesive means is arranged can be provided on the contact body in the region of the work surface or adjacent to the work surface. Thus the contact body itself more or less forms a component of the holding element or in any case an actuating element for the holding element.

However, it is also possible for the device to have a bearing device for movably mounting the holding element, for example for adjusting the holding element from the positioning state to the adhesive state or from the adhesive state to the positioning state. However, it is also possible that the bearing device is used so that the holding element and the contact body are positionable relative to one another. It is therefore possible, for example, for the holding element to be mounted displaceably in a plane parallel to the contact surface on the contact body, so that the contact body is movable relative to the holding element when it is already adhering to the work surface.

If a bearing device is provided, a fixing device is preferably provided for fixing the holding element and the contact body to one another, for example a clamping device, latching device, or the like. Then, for example, the contact body can be fixed relative to the holding element so that it maintains its position.

The holding element is expediently mounted pivotably on the bearing device for pivoting the adhesive means towards the contact surface or work surface into the adhesive state and/or away from the contact surface or work surface in the sense of detaching the adhesive means from the work surface. For example, it is possible that the contact body is positioned on the work surface, then the holding element is pivoted in the direction of the adhesive state, so that the overall configuration comprising the contact body and the holding element are strongly fixed to the work surface. This pivot mounting is also advantageous for a detaching process. For example, the adhesive means can be pivoted away from the work surface in a kind of peeling process, so that the holding element and therefore also the contact body come free from the work surface.

The bearing device can, however, also comprise a sliding bearing, on which the holding element is displaceably mounted towards the contact. A sliding direction or a sliding axis direction of the sliding bearing is preferably orthogonal to the contact surface. For example, it is possible for the adhesive means to have an adhesive surface which is oriented in parallel to the contact surface. The bearing device preferably enables a parallel displacement of the adhesive surface in the direction of the contact surface in order to establish an adhesive contact with the work surface. For example, an adhesive bonding surface can be designed as an adhesive surface. However, it is also possible that the adhesive surface is defined, for example, by an outer circumferential contour of a suction section, in particular a free region of a suction head. If multiple adhesive surfaces are present, these are preferably provided in or on an envelope surface or envelope plane.

The holding element can be rigid and/or flexible. For example, the holding element can be flexible in one or more directions or include flexible sections. It is also possible for the holding element as a whole to be rigid in one or more directions. The holding element can include at least one rigid section and at least one flexible section. For example, one or more reinforcing ribs and/or a plate-like shape of the holding element or carrier body or the like are advantageous for rigidity. For the flexible property, for example, a correspondingly flexible material of the holding element or carrier body, for example plastic, and/or deformation recesses on the holding element or the like are suitable.

Furthermore, it is possible for the holding element to be flexible for an adjustment between the positioning state and the adhesive state. For example, the holding element can be brought from the positioning state into the adhesive state in a kind of rolling motion or unwinding motion. The adhesive means is active immediately, i.e., it is brought into adhesive contact with the work surface more or less sequentially or in a flowing process, or it can be brought into the adhesive state due to the flexibility of the holding element.

The following embodiment is advantageous in particular if the holding element is flexible:

The holding element is advantageously deformable from the positioning state into the adhesive state in a supporting state, in which the holding element is partially supported on the contact body, for example at one or both of its longitudinal ends. For example, the holding element can arch away from the contact surface between its longitudinal ends, which corresponds to the positioning state. By applying pressure in a section between the longitudinal ends in the direction of the contact surface, the holding element can be brought or deformed into the adhesive state, in which the adhesive means is then in a plane with the contact surface.

The holding element is advantageously rollable or unwindable in the sense of rolling up or unwinding the adhesive means in the direction toward the work surface. For example, the holding element as a whole or an adhesive body comprising or including the adhesive means can be rolled up, so to speak, on the work surface. Thus, for example, the holding element can be brought from the positioning state into the adhesive state. However, it is also possible that such a rolling movement is used, for example, to detach the holding element from the work surface. The holding element can therefore advantageously be wound up in a rollable manner away from the work surface in the sense of winding up or rolling up or peeling off the adhesive means.

A preferred concept provides that the holding element includes at least one recess and/or at least one transverse reinforcing body, in particular a transverse rib, transversely to its longitudinal extension or transversely to a rolling direction provided for winding or rolling the holding element. The transverse rib and/or the transverse reinforcing body and/or the recess preferably extend over the entire transverse width of the holding element. The recess facilitates a winding actuation or bending actuation of the holding element in the direction of the adhesive state or out of the adhesive state. The transverse rib or the transverse reinforcing body reinforces the holding element transversely to its longitudinal extension.

The holding element can be arranged permanently on the contact body. For example, the contact body can include one or more suction heads that do not or only slightly wear, so that an exchange of the holding element is not necessary. It is also possible, for example, for the adhesive means itself to be fixedly arranged on the contact body, but to be exchangeable, for example a new adhesive bonding layer to be attachable to the adhesive element.

It is advantageous if the holding element is held detachably on the contact body by means of a fastening means. It is therefore expedient if the device includes a fastening means, using which the holding element is detachably held on the contact body.

A worn holding element can thus be replaced by another, unused holding element. For example, a holding element whose adhesive bonding surface no longer sticks can be replaced by another holding element. However, the replacement of alternatively working or functioning holding elements is also easy in this way. For example, a holding element which has an adhesive bonding surface can be exchanged for a holding element having a suction section.

The fastening means can comprise many variants, for example formfitting holders, plug-in receptacles, or the like. It is also possible for the holding element to more or less form a latching element which can be latched to the contact body.

The fastening means advantageously includes at least one formfitting contour on the holding element for a formfitting hold on a holding element receptacle of the contact body, in particular a recess and/or at least one rear engagement surface, for example an undercut, for the holding element.

The contact body preferably includes at least one holding element receptacle for the holding element. The holding element receptacle preferably extends from the contact surface to an upper side of the contact body opposite to the contact surface. The holding element can thus be introduced into the holding element receptacle from the upper side. The contact surface is preferably arranged on a plate section of the contact body and/or adjacent to a guide receptacle or a guide projection and/or on a planar guide surface.

The at least one holding element receptacle of the contact body is advantageously accessible from a side of the contact body facing away from the contact surface, in particular from a side opposite to the contact surface, or is open on this side or includes an opening on this side.

The at least one holding element receptacle is preferably arranged away from and/or adjacent to and/or outside a guide contour of the contact body, which is provided for guiding the tool or the machine tool. The guide contour is or comprises, for example, a guide rib which protrudes in front of an upper side of the contact body or the guide rail and is preferably open towards the contact surface.

The holding element preferably has a flat shape or has a shape such that in the state received in the holding element receptacle, when it fixes the contact body with respect to the work surface, it does not protrude in front of a guide surface or support surface on which the tool or the machine tool is guided or supported on the contact body, and/or the machine tool or the tool can be movably guided over the holding element received in the holding element receptacle.

One preferred concept provides that the holding element is accessible from an upper side of the contact body opposite to the contact surface, for example for adjusting between the positioning state and the adhesive state, but in the adhesive state protrudes at most enough in front of an upper side surface on the upper side of the contact body so that the tool or the machine tool can be guided along the upper side of the contact body in parallel to the contact surface or having a directional component in parallel to the contact surface of the contact body over the holding element. For example, the holding element protrudes by a predetermined maximum amount in front of the upper side surface of the contact body or is flush with the upper side surface or is set back behind the upper side surface.

The holding element can be brought directly into the adhesive state when it is introduced into the holding element receptacle of the contact body. However, it is also possible for the holding element to be prepositionable in the holding element receptacle or to assume a prepositioning state in which the holding element is at least partially held in the holding element receptacle and the adhesive means is still in the positioning state. The contact body is then adjustable relative to the work surface. In the prepositioning state, for example, there is a distance between an adhesive surface of the adhesive means and the work surface of the workpiece or the wall. The distance can be a parallel distance, for example. However, it is also possible that the holding element is partially pivoted out of the holding element receptacle in the prepositioning state and/or has an arced profile, in particular in the region of an adhesive surface of the adhesive means. The holding element is then furthermore movably received within the holding element receptacle, for example pivotable and/or displaceable, in particular translationally or linearly displaceable, and/or deformable in order to move the adhesive means from the positioning state to the adhesive state.

The formfitting contour advantageously has at least one rear engagement contour for engaging behind at least one rear engagement surface of the holding element receptacle of the contact body, wherein the rear engagement contour supports the rear engagement surface of the contact body, when it bears against the rear engagement contour, with at least one supporting force component oriented in the direction of the contact surface in the sense of holding the contact body on the work surface. The rear engagement surface thus extends, for example, in parallel or obliquely to the contact surface. The rear engagement contour preferably includes at least one engagement section which extends in parallel or with a directional component in parallel to an adhesive surface of the holding element, using which it can adhere to the work surface. For example, the rear engagement surface can extend obliquely to the contact surface and the rear engagement contour can extend obliquely to the adhesive surface.

The at least one rear engagement contour comprises, for example, a dovetail contour, a support projection, a hook, or the like. Combinations are easily possible. Counter contours matching thereto are provided on the holding element receptacle of the contact body, for example a support surface for a support projection, a hook receptacle, or a support surface for the hook that supports the hook. The dovetail contour engages in a formfitting manner in a complementary dovetail counter contour.

It is preferred if the holding element receptacle includes a rear engagement surface on each of opposite sides and the holding element includes a rear engagement contour on each of opposing sides, which are associated with the abovementioned opposite sides of the holding element receptacle. The rear engagement surfaces can, for example, extend obliquely towards one another in a funnel-like manner or can be parallel. For example, the rear engagement surfaces can be provided on a side of the contact body that is opposite to the contact surface. The rear engagement contours can extend obliquely to the adhesive surface of the adhesive means, for example, or also in parallel thereto.

The holding element can, for example, be inserted and/or pivoted into the holding element receptacle. The holding element then preferably bears in a formfitting manner on at least two opposing or opposite sides of the holding element receptacle. It is possible for the holding element to be mounted displaceably in the holding element receptacle along these opposite sides. An undercut on the holding element receptacle prevents, for example, the holding element from being able to move out of the holding element receptacle in the direction of its adhesive means or in the direction of the work surface.

The holding element receptacle can, for example, comprise a window or a through opening which extends between the contact surface and an upper side of the contact body opposite to the contact surface. The holding element can be inserted into the through opening, which in this respect represents an insertion opening or plug-in receptacle, so that, for example, in the inserted state, the adhesive means lies in one plane with the contact surface or protrudes in front of the contact surface. A plug-in axis, along which the holding element can be inserted into the holding element receptacle, preferably extends with at least one directional component or in general at right angles to the contact surface of the contact body.

It is also possible for the holding element to be pivotable from the positioning state into the adhesive state during the installation or arrangement in the holding element receptacle. For this purpose, the holding element can include a pivot section and/or the holding element, when it is at least partially in engagement with the holding element receptacle, can be pivotable in the holding element receptacle. It is therefore possible for a holding element to be pivotably accommodated in a holding element receptacle of the contact body for adjustment from the positioning state into the adhesive state.

It is possible that the holding element is movably or displaceably received in the holding element receptacle, so that the holding element as a whole and/or the adhesive means can be brought from a or the positioning state, in which the adhesive means is not yet in contact with the work surface and/or is arranged set back behind the contact surface, by adjustment, in particular displacement, in the holding element receptacle into an adhesive state, in which the adhesive means adheres to the work surface and fixes the contact body on the work surface It is possible for the holding element in this embodiment to be flexible and to be able to be brought from the positioning state into the adhesive state both by way of its flexibility and also by way of the displaceability or adjustability in the holding element receptacle.

However, it is also possible that the holding element is rigid. The rigid holding element can advantageously be brought from the positioning state into the adhesive state by adjustment, in particular displacement and/or pivoting, within the holding element receptacle. For example, the holding element is displaceably and/or pivotably received in the holding element receptacle with a directional component towards the contact surface of the contact body.

It is also possible that the holding element receptacle includes a longitudinal guide for guiding the holding element along a longitudinal axis, which extends, for example, in parallel to the contact surface or has a directional component in parallel to the contact surface. The longitudinal guide can be closed at one longitudinal end, that is to say designed in the manner of a pocket. The longitudinal guide is preferably open at its longitudinal end regions, so that the holding element can be inserted into the longitudinal guide at one longitudinal end region and can be guided out of the longitudinal guide at the other longitudinal end region. Thus, for example, a bidirectional, nearly unlimited displaceability of the contact body relative to the holding element is possible.

The at least one formfitting contour of the holding element is preferably arranged on a side or upper side of the holding element that is opposite to the adhesive means or the adhesive surface of the adhesive means.

The at least one formfitting contour of the holding element can, for example, comprise one or more support projections.

It is preferred if the holding element, for an alignment or a hold of the adhesive means, for example in parallel or substantially in parallel, with respect to the contact surface of the contact body, has at least one support projection extending transversely to the adhesive means, in particular its adhesive surface, for supporting on a support contour of the contact body that is in parallel or inclined at an angle of less than 90° to the contact surface. The at least one support projection is, for example, a hook projection or comprises a hook projection.

The at least one support projection expediently forms part of an arrangement of multiple support projections. The holding element preferably has at least one support projection in each case on opposite sides, but in particular a row of support projections arranged adjacent to one another. The support projection can be, for example, a hook projection or support hook. The at least one support projection can, for example, engage in a rear engagement surface or undercut surface of the contact body. The rear engagement surface is provided, for example, on an upper side of the contact body opposite to the contact surface. The support projection thus ensures, for example, that the contact body of the holding element cannot be removed from the holding element in a movement direction having a movement component that is at right angles to the work surface or the contact surface.

The contact body expediently has an upper side which is opposite to the contact surface and which forms the support contour or on which the support contour is arranged. For example, the support contour is designed as an inclined surface on the holding element receptacle already described as a through opening. However, it is also possible that the upper side itself forms the support contour, i.e., for example, that a hook projection or other part of the support projection is supported directly on the upper side of the contact body.

Furthermore, the support contour can comprise or form a guide receptacle of a linear guide, while the at least one support projection forms a guide projection for linearly guiding the holding element on the contact body and engages in the guide receptacle. The guide receptacle can for example be designed in the manner of a groove. Furthermore, the guide receptacle is advantageously designed in the manner of an undercut or a guide groove.

It is preferred if the holding element has at least one support surface angled, for example, at right angles, to an adhesive surface of the adhesive means, for supporting on the contact body, so that the contact body is supported on the holding element in relation to forces acting in parallel to the contact surface. The support surface is preferably the above-mentioned sliding surface. At least one latching projection or another latching contour is preferably arranged on the support surface or adjacent to the support surface.

The at least one support surface preferably comprises multiple support surfaces, for example support surfaces provided on opposite sides of the holding element. The support surfaces are preferably provided in such a way that they support the holding element on the contact body in relation to all forces acting in parallel to the contact surface.

The holding element is preferably designed as a latching element. A latching arrangement is preferably provided as one or the fastening means for latching the holding element with the contact body. The latching arrangement can comprise, for example, latching hooks, latching lugs, latching tongues, or the like, which latch into corresponding latching receptacles. The latching arrangement thus comprises, for example, latching contours on the holding element which can be brought into latching engagement with latching counter contours on the contact body.

The latching arrangement expediently has at least one latching contour for latching the holding element with the contact body, wherein the latching contour has a sliding surface or is arranged on a sliding surface, using which the holding element is slide-displaceably mounted on the contact body between the positioning state and the adhesive state. For example, the holding element having the at least one sliding surface (preferably multiple sliding surfaces are provided) can slide along the above-mentioned holding element receptacle of the contact body, for example the through opening, in order to get into touch contact with the work surface more or less through the contact body and establish the adhesive state.

The sliding surfaces are provided, for example, on the above-mentioned support projections or support hooks.

Furthermore, it is advantageous if the fastening means includes or comprises an adhesive bond, using which the holding element is adhesively bonded to the contact body. A detachable adhesive bond is again advantageous here, i.e., the holding element can be readily removed from the contact body and is exchangeable with another, adhesive holding element.

During the adhesive bonding of the holding element to the contact body, it is advantageous if the adhesive bond and the adhesive means are arranged on opposite sides of the holding element. Thus, the holding element can for example be adhesively bonded to a surface adjacent to the contact surface of the contact body, while the adhesive means or an adhesive surface of the adhesive means is in alignment with the contact surface or lies in a plane with the contact surface. Of course, the adhesive means or an adhesive surface thereof can also protrude somewhat in front of the contact surface.

It is preferred if the holding element has at least one support contour or latching contour, using which the holding element is supported on an buttress contour or support contour of the holding element receptacle in the positioning state and which, by applying force to the holding element in the direction of the adhesive state, is movable past the buttress contour or support contour of the holding element receptacle in the direction of the adhesive state.

The adhesive means can be exposed in the positioning state. Thus, for example, the adhesive state can be achieved by adjusting the adhesive means or its adhesive surface in the direction of the contact surface or the work surface. Of course, it is advantageous if such an adhesive means is also protected, for example for transport purposes, in particular by the cover explained below. This cover can for example already be removed from the adhesive means in the positioning state, so that this is in principle immediately available for establishing the adhesive contact. However, it is also possible for the adhesive means to be covered by a cover in the positioning state, which can be removed from the adhesive means to bring it into the adhesive state.

The cover is, for example, film-like or flat. It is advantageous if the cover comprises a cover film. It is also expedient if the cover completely covers the adhesive means. Thus, the adhesive means is, so to speak, inactive as long as the cover is arranged on the adhesive surface or the adhesive means.

The cover expediently has a cover section covering the adhesive means and an actuating section which can be manually actuated by an operator in the positioning state, by means of which the cover section can be removed from the adhesive means and brought into the adhesive state, for example by pulling actuation. For example, a handle or handle section is located on the actuating section. The actuating section as a whole can also represent a handle section. For example, the handle section is designed in the manner of a holding tongue or gripping tongue for grasping. The handle section can be clamped between two fingers of the operator, for example, in order to actuate it.

The handle section of the actuating section projects, for example, laterally in front of the contact body and/or through a recess in the contact body for grasping by the operator when the holding element is arranged or fastened on the contact body and/or the contact body is already arranged on the work surface. For example, a type of window or other similar recess can be provided on the contact body, through which the actuating section or handle section protrudes so that the operator can grasp it.

It is also advantageous if the handle section protrudes in front of a carrier body of the holding element which includes or carries the adhesive means, for example its longitudinal end region.

In the positioning state, it is advantageous if at least a part of the actuating section bears against the cover section, for example bears flatly. It is furthermore advantageous if the cover includes at least one deflection section between the actuating section and the cover section. Both are possible in combination. For example, the actuating section and the cover section can bear against one another and be connected to one another via the deflection section. For example, a kind of peeling off or pulling off of the cover section is easily possible, for example by a pulling actuation of the actuating section.

The cover section can thus be peeled off the adhesive means in this way. This configuration is therefore particularly advantageous because the cover can be removed from the adhesive means in the sense of peeling off or unwinding. This can more or less be brought into the adhesive state sequentially or gradually. The actuating section and the cover section are preferably made of the same material, in particular film-like. Thus, for example, the adhesive means can already bear against the work surface as long as it is still in the positioning state. The operator can then remove the cover from the adhesive means, for example pull off, peel off, or the like, by actuating the actuating section. It is possible here for the above-mentioned deflection section more or less to roll or travel along the surface, in particular the adhesive surface, of the adhesive means.

An adhesive body of the holding element which carries or forms the adhesive means expediently has a handling section which can be actuated manually by an operator in the adhesive state and which, for example, can be grasped by the operator. On the basis of the handling section, the adhesive body can be actuated to bring the adhesive means from the adhesive state into a release state remote from the work surface of the workpiece. The adhesive body can thus be peeled off more or less as a whole. Such an actuation is preferably possible when the contact body bears against the work surface and/or when it is removed from the work surface.

The adhesive means expediently extends along a longitudinal axis of the adhesive body. The adhesive body can advantageously be stretched in the direction of its longitudinal axis by a pulling actuation of the handling section to detach the adhesive means from the work surface. By stretching the adhesive means, adhesion of the adhesive means on the work surface can preferably be changed or cancelled.

The handling section of the adhesive body advantageously projects laterally in front of the contact body and/or through a recess in the contact body for grasping by the operator when the holding element is arranged or fastened on the contact body. In particular, the handling section can also be grasped by the operator in this situation when the contact body bears against the work surface. Thus, the adhesion of the entire device to the work surface can be released by more or less actuating the adhesive body, for example by stretching it. It is also possible, however, for the adhesive body to be detached from the workpiece or the wall or its work surface in the manner of a peeling movement or unrolling movement.

The handle section of the cover element and the handling section of the adhesive body are arranged, for example, on opposite sides of the holding element. If the handle section and the handling section are arranged on the same side of the holding element, for example at the same longitudinal end, this represents a further option. In particular, it is then advantageous if the two components, the handling section and the handle section of the cover element, protrude different distances in front of the holding element, so that they can be grasped one after the other. It is particularly advantageous if the handle section of the cover element protrudes farther in front of the holding element than the handling section of the adhesive body.

It is advantageously provided that the adhesive means can be adjusted between the positioning state and the adhesive state by adjusting the holding element with respect to the contact body, e.g. by adjusting the holding element in or on the or a holding element receptacle provided for receiving the holding element, e.g. a recess, of the contact body, for example, can be brought from the positioning state into the adhesive state or from the adhesive state into the positioning state.

It is furthermore advantageously provided that the adhesive means can be brought from the positioning state into the adhesive state by introducing the holding element into a holding element receptacle provided for receiving the holding element, in particular a recess, in the contact body. For example, the holding element can be inserted into the holding element receptacle in order to adjust it from the positioning state to the adhesive state.

It is preferably provided that the holding element includes at least one support contour or latching contour for supporting the holding element on a buttress contour in the positioning state, wherein the support contour or latching contour is movable past the buttress contour of the holding element receptacle to adjust the holding element in the direction of the adhesive state. By means of the latching contour or support contour, the holding element can be supported on the buttress contour of the holding element receptacle, wherein the holding element is already received in the holding element receptacle but is not yet in the positioning state. This state can also be referred to as a prepositioning state. The holding element is advantageously held in a formfitting manner on the holding element receptacle by means of the support contour or latching contour, but the adhesive means is not yet in the adhesive state. The operator can still perform a further operating action, for example by pressing the holding element in the direction of the contact surface of the contact body, to adjust the holding element or adhesive means from the positioning state to the adhesive state.

It is advantageous if the holding element includes an actuating handle using which the adhesive means can be brought from the positioning state to the adhesive state by an operating actuation, in particular a pressure actuation in the direction of the contact surface or a pulling actuation by an operator. The actuating handle can be arranged, for example, on a side of the adhesive element that is opposite to the adhesive means. For example, the actuating handle can be arranged on the upper side of the adhesive element or can be formed by the upper side of the adhesive element. The actuating handle can also comprise, for example, a pull tab or other similar actuating element.

In the design and/or arrangement of the actuating handle, there are several possibilities, for example that the actuating handle protrudes laterally in front of the contact body and/or is accessible for the operating actuation from a side of the contact body facing away from the contact surface of the contact body, in particular opposite thereto, when the holding element is arranged on the contact body, in particular is arranged in a holding element receptacle of the contact body.

Another possibility for fastening the holding element to the underlying surface is given by the following measure:

The holding element advantageously has one or more through openings for a fastening bolt, for example a screw or a nail, using which the holding element can be connected to the work surface. At this point it should be mentioned that this embodiment of a holding element, which is detachably fastened, for example latched, connected by means of a plug connection, or the like, using formfitting fastening means on a guide body for a machine tool or as a part of a machine tool, for example a guide rail for a machine tool or a guide body of a machine tool, for example a support foot, represents an independent invention as such. An adhesive means, for example an adhesive bond, suction means, or the like, for detachable adhesion on the work surface is optionally possible in this case in the holding element, but is not required. In particular when the holding element can be detachably fastened on the contact body or guide body when the contact body already so bears against the work surface, in particular when the guide body already bears against the work surface, and subsequently the holding element can be connected by means of a nail or other fastening bolt to the work surface, this represents an independent invention as such, but can also be an improvement or embodiment of the invention mentioned at the outset.

The contact body preferably forms a guide body, for example for the machine tool or a workpiece. For the function as a guide body, the contact body preferably includes at least one guide contour, for example a guide projection extending along its longitudinal extension. The guide body can, however, also include or comprise a machine bearing which mounts the machine tool so it is displaceable, pivotable, or both on the guide body. The machine bearing can include, for example, a pivot bearing. The machine bearing can, however, also include or comprise one or more guide elements, in particular at least one guide rod, extending transversely, for example perpendicular to the contact surface. For example, the at least one guide element forms part of a linear bearing, using which the machine tool can be moved in the direction of the contact surface and thus towards the workpiece or the wall or away from the workpiece or away from the wall.

The contact body is, for example, a component of a machine tool or is suitable for guiding a machine tool. The contact body can, however, also be used to guide, for example, a hand tool to be operated manually, in particular a cutting tool. Furthermore, the contact body can support a workpiece.

The contact body can be, for example, a guide body, for example a ruler or the like, for a manually actuatable tool, in particular a cutting tool, for example a scribe, a glass cutter, or the like.

It is furthermore possible that the contact body forms part of a machine tool, for example a work table, using which the machine tool can be arranged on the work surface. The holding element ensures that the guide body is held strongly on the work surface.

The machine tool and the contact body can also be components that are separate from one another and that are only brought into contact with one another for work operation, for example for introducing a saw cut in the workpiece.

The guide body can also form a guide rail, the lower side of which includes or forms the contact surface of the contact body and the upper side of which, opposite to the lower side, includes a sliding surface for displacing the machine tool. On or adjacent to the sliding surface, a guide contour, for example, the above-mentioned elongated guide contour, for example a guide groove for a guide projection or a guide rib is advantageous. The guide rail can thus more or less represent a slide rail for the machine tool.

A system comprising the contact body and a machine tool is also preferred. The contact body can form part of the machine tool, for example a guide table, a stand, or the like.

Holding means, for example angled surfaces, support surfaces, or the like, for fixing a further object, for suspending an object, or the like can be provided on the contact body.

The contact body can be plate-like. The contact body can be or comprise a guide rail.

The contact body can, however, also include at least two legs which are angled to one another, wherein a holding element of the above-mentioned type is arranged or can be arranged on one of the legs. For example, a receptacle, in particular a bearing receptacle or a holding receptacle, for the holding element is provided on one of the legs. The contact body can also have multiple legs that are angled to one another. For example, the legs can form a U-shaped configuration. Furthermore, the contact body can have a base leg, on which the holding element is arranged or can be arranged, from which one side leg or two side legs protrude. From one of the side legs, another side leg also advantageously protrudes, preferably in parallel to the base leg of the contact body.

The machine tool can be, for example, a saw, in particular a circular saw, plunge-cut saw, jigsaw, or the like. The machine tool can, however, also be a drilling machine, milling machine, in particular a router, or the like. The machine tool is preferably a handheld machine tool. The machine tool includes a drive motor, for example an electric drive motor, for driving a tool holder on which a work tool, for example a saw blade, a drill head, a milling head, or the like, is arranged or can be arranged.

BRIEF DESCRIPTION OF THE DRAWINGS

In the following, exemplary embodiments of the invention are explained with reference to the drawing. In the figures:

FIG. 1 shows a perspective diagonal view of a device having a contact body and two holding elements in an embodiment of a guide body for a machine tool, FIG. 2 shows an enlarged detail D1 from FIG. 1 having the holding element in the state partially removed from the contact body, FIG. 3 shows a longitudinal section along a section line A-A in FIG. 2, FIG. 4 shows a view of the detail D1 shown in FIG. 1 having a holding element, which is still in a positioning state, FIG. 5 shows a sectional view along a section line B-B in FIG. 4, FIG. 6 shows the detail according to FIG. 3 or 5 having the holding element, which is already in the adhesive state, FIG. 7 shows a cross section through the contact body and the holding element of FIG. 1 along a section line C-C in FIG. 1, FIG. 8 shows a detail D2 from FIG. 7, FIG. 9 shows a detailed view approximately corresponding to the detail D1 having an alternative holding element which can be fastened to the underlying surface using nails, FIG. 10 shows a bottom view of an arrangement approximately corresponding to FIG. 1, wherein the holding element comprises suction means, FIG. 11 shows an enlarged detail approximately corresponding to a detail D3 in FIG. 10, FIG. 12 shows a sectional view approximately along a section line D-D in FIG. 10 of the holding element and the contact body, FIG. 13 shows a contact body in the form of a rollable guide rail having a holding element approximately corresponding to the arrangement according to FIG. 1, FIG. 14 shows a contact body as part of a machine tool having a holding element according to FIG. 1, FIG. 15 shows the machine tool according to FIG. 14 from below, FIG. 16 shows a further contact body having the holding element according to FIG. 1, which is shown in FIG. 17 from its long side and in FIG. 18 from its front side, FIG. 19 shows a schematic illustration having a holding element which has a dovetail contour for engaging in a dovetail receptacle of a contact body in the state not yet installed on one another, FIG. 20 shows the contact body having installed holding element according to FIG. 19, FIG. 21 shows a schematic illustration of a further contact body, on which two alternative holding elements, also shown in FIG. 21, can optionally be installed, FIG. 22 shows a perspective illustration of a contact body in the form of a guide rail, on which different variants of holding elements are arranged and of which FIG. 26 shows a perspective illustration of a holding element which is shown in FIG. 27 with the cover element partially removed, FIG. 28 shows a section along a section line E-E through a holding element according to FIG. 25, FIG. 29 shows the view according to FIG. 28, wherein a cover element is partially removed, FIG. 30 shows the view according to FIGS. 28, 29, wherein the cover member is completely removed and the adhesive state is reached, and FIG. 31 shows the configuration according to FIGS. 28-30, wherein an adhesive body of the holding element is at least partially removed.

DETAILED DESCRIPTION

Figure 22:
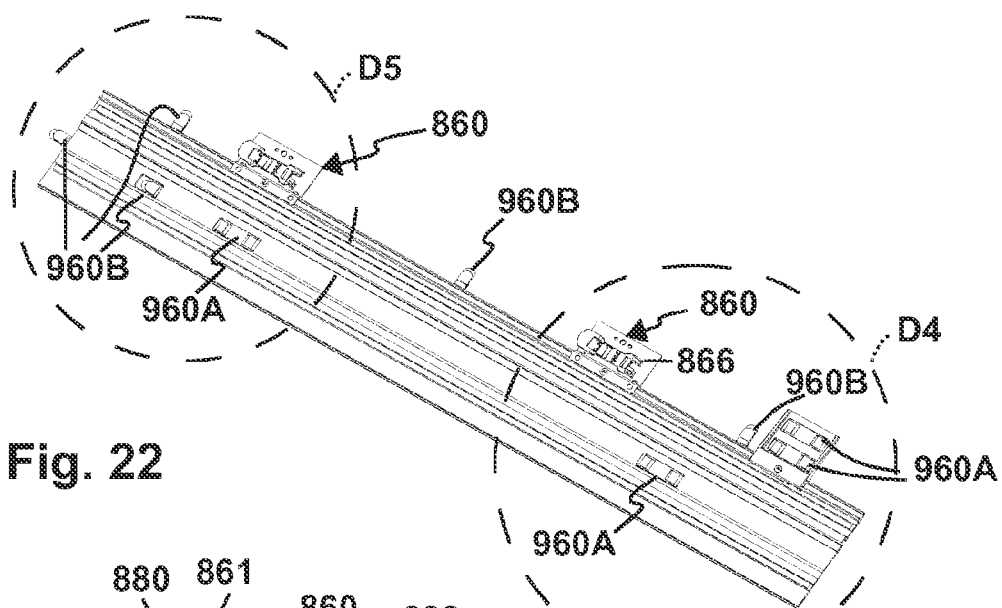
Figure 23:
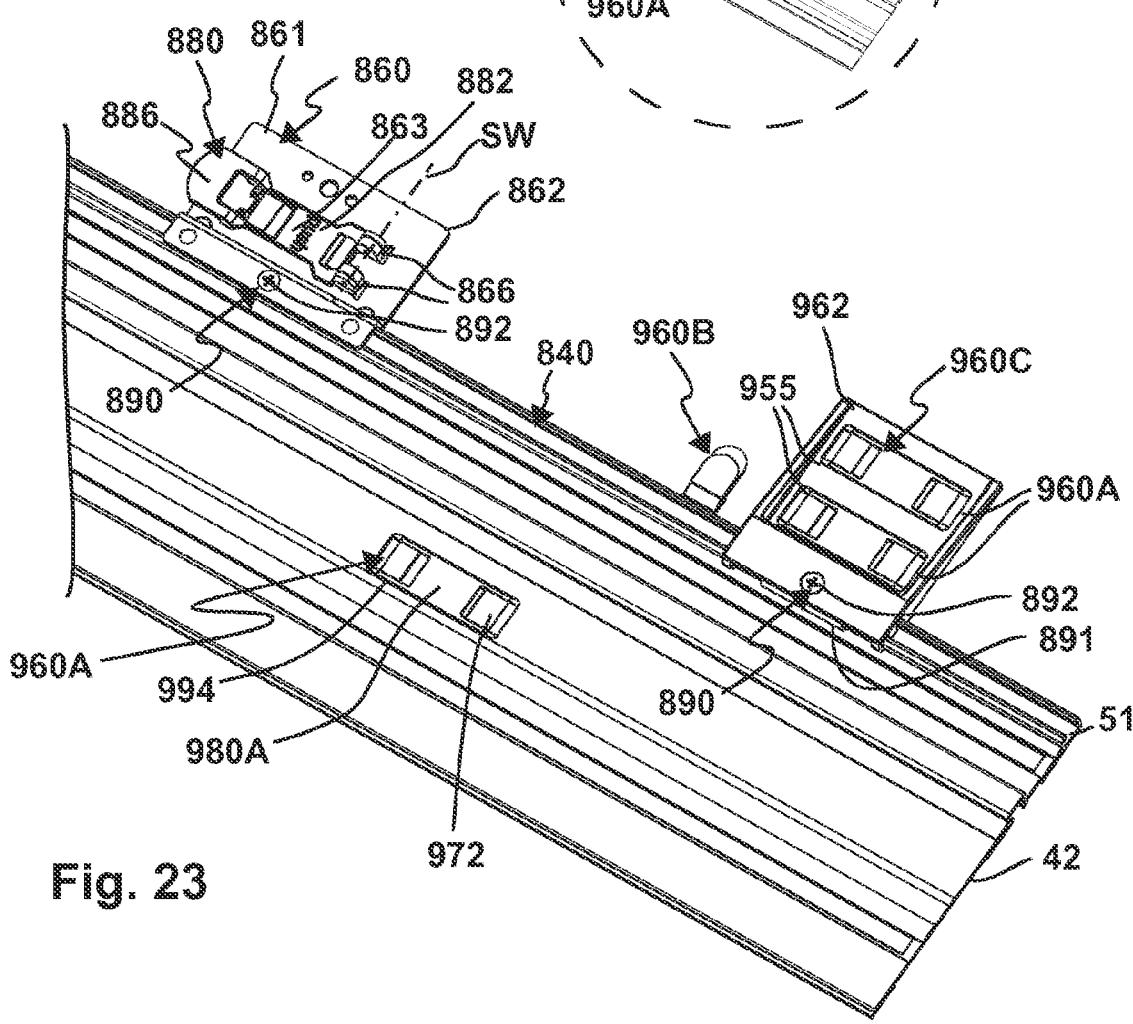
FIG. 23 shows a detail D4.
Figure 25:
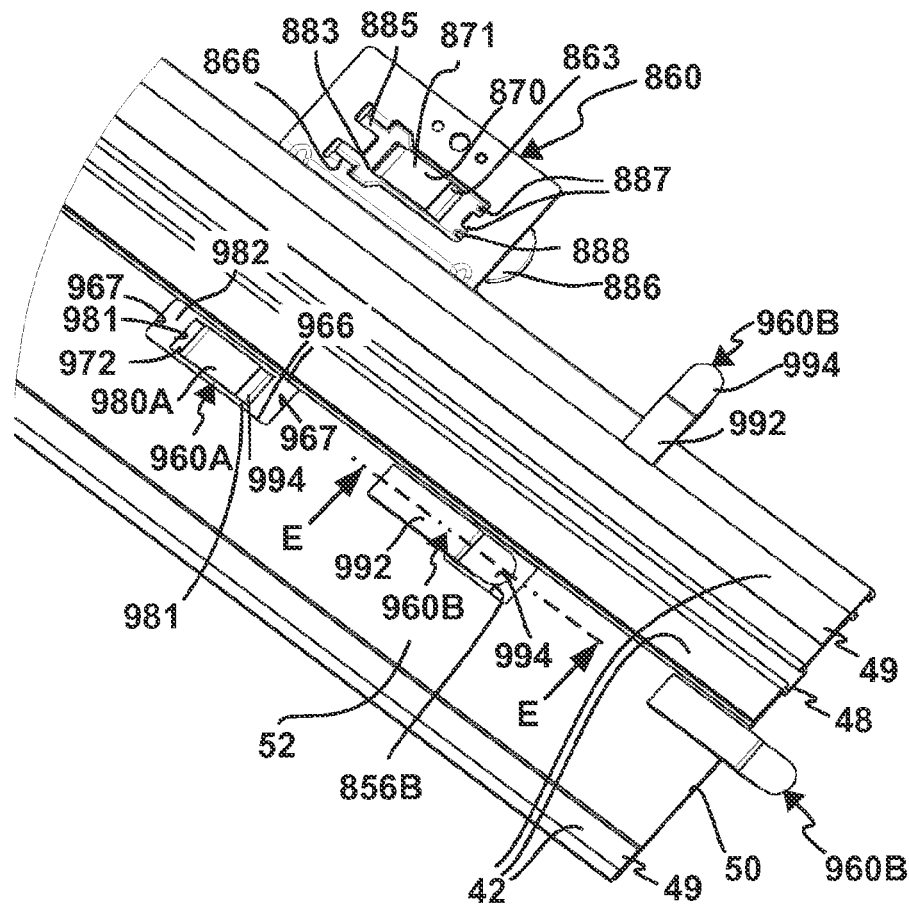
FIG. 25 shows a bottom view of the detail according to FIG. 24.
Figure 24:
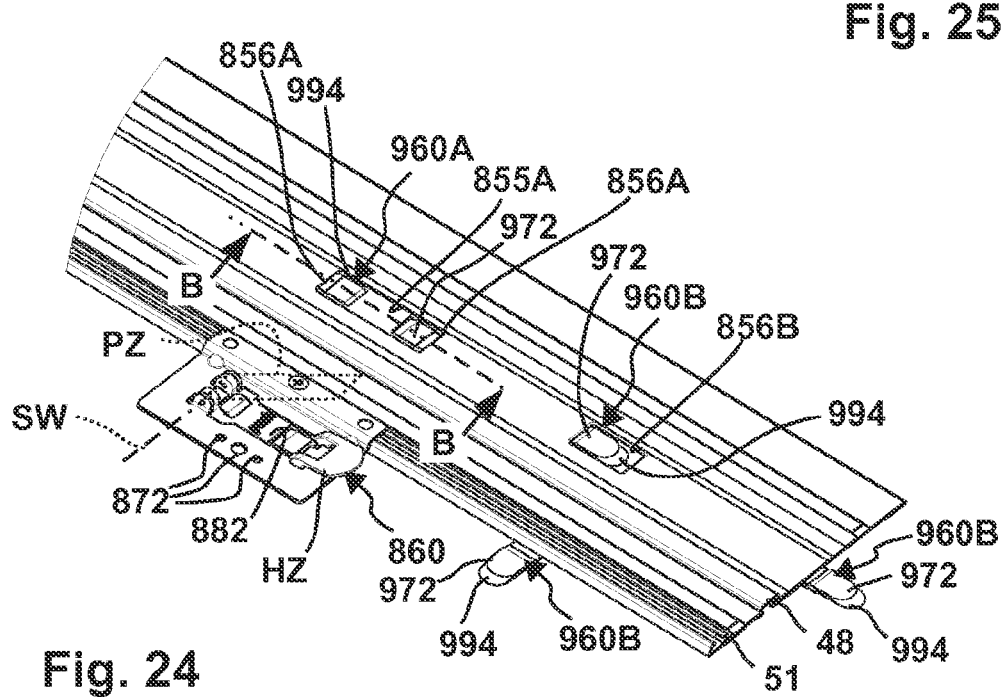
FIG. 24 shows a detail D5 of the guide rail according to FIG. 22.

A system 10A comprises a machine tool 20, which includes a guide element 21 and a drive unit 22, which is arranged on the guide element 21, in particular pivotably mounted. The drive unit 22 includes a drive 23, for example a drive motor, which drives a work tool 24, for example a saw blade, directly or via a gear unit (not shown in the drawing).

It is now possible to position the guide element 21 directly on a workpiece W or to guide it along, for example to introduce a saw cut in a work surface H. However, the accuracy during such workpiece machining is not optimal It is therefore provided that the machine tool 20 is guided along a device 30, which thus forms a guide device, and which includes, for example, a contact body 40 in the form of a guide rail 41. The guide rail 41 and thus the contact body 40 includes a contact surface 42 provided for contact with the work surface H and an upper side 43 opposite the contact surface 42, along which the guide element 21 and thus the machine tool 20, in the present case a saw, can be guided. The contact body 40 is plate-like and includes narrow longitudinal sides 44, 45 as well as end sides or longitudinal end sides 46.

A schematically illustrated, manually actuatable or guidable or holdable tool 120, which includes a work tool 121, for example a scoring tool, can also be guided or supported on the contact body 40.

Furthermore, a guide projection 48A is provided on the upper side 43, for example a sliding surface, i.e., a guide contour 48 for guiding the machine tool 20 along a longitudinal extension L of the contact body 40. For example, the guide projection 48A engages in a guide receptacle 25 on the guide element 21. The guide projection 48A is, for example, a longitudinal rib, and the guide receptacle 25 is a longitudinal groove.

The guide contour 48 projects in front of a plate section 54 of the contact body 40.

For example, the machine tool 20 and/or the tool 120 can be guided along a working direction AR or the longitudinal extension L along the contact body 40, in particular with support or guidance on the guide contour 48 or the guide projection 48A.

In addition to the guide contour 48, in particular in the region of the plate section 54, strip-shaped guide surfaces 54A are provided in particular, which extend along the longitudinal extension L of the contact body 40 and along which the guide element 21 of the machine tool 20 slides when moving along the longitudinal extension L.

The work tool 24 is guided along the longitudinal side 44. A lip 47 is provided on the longitudinal side 44, for example, which represents a splinter protection and is preferably cut off using the work tool 25 during a first saw cut.

A bearing surface of the lip 47 facing toward or associated with the work surface H bears against the work surface H when the contact body 40 is placed on the workpiece W. Furthermore, the contact body 40 and thus the guide rail 41 are supported on the work surface H using support elements 49, for example strips made of rubber or similar other elastic material. The bearing surfaces of the bearing elements 49 and of the lip 47 form the contact surface 42 of the contact body 40.

The bearing elements 49 and the lip 47 are arranged on a profile body 50, on which the guide contour 48 and the upper side 43 or the sliding side of the guide rail 41 are formed. The profile body 50 can also have further profile contours for guiding or supporting the machine tool 20, but these will not be discussed in more detail.

A receptacle 51 is advantageously also provided on the longitudinal side 45 of the contact body 40, which is suitable, for example, as a holding receptacle for holding elements still to be described, for example a holder 861 for such a holding element. The holder 861 is held by means of a clamping body 891 which can be inserted and/or engages in the receptacle 51, for example in the manner of a slot nut, which can be clamped in the receptacle 851 using a clamping screw 892. The receptacle 51 is an elongated receptacle groove, so that the holder 861 or the holding element can be displaced into various longitudinal positions along the longitudinal extension L of the contact body 40.

The contact surface 42 is advantageously frictionally engaged, i.e., the contact body 40 is held on the work surface H with a predetermined frictional force or holding force due to the relatively soft and/or adhering contact surface 42. However, in particular when producing a saw cut in the workpiece W, considerable forces can occur, so that the contact body 40 slips on the work surface H. The following measures are provided to remedy this:

If necessary, the contact body 40 can be provided with holding elements 60, each of which has an adhesive means 70. The adhesive means 70 is, for example, an adhesive layer or comprises an adhesive layer. An adhesive surface 71 of the adhesive means 70 is suitable for detachably adhering to the work surface H.

The adhesive means 70 is arranged on a carrier body 80 of a respective holding element 60, which can be detachably connected to the contact body 40 in a formfitting manner.

The carrier body 80 forms a plug-in body and/or clamping body and/or latching body which can be inserted into holding element receptacles 55 of the contact body 40, that is to say the guide rail 41. The holding element receptacles 55 advantageously form plug-in receptacles 55A.

The holding element receptacles 55 have opposite, longer longitudinal sides 56 which extend between longitudinal end sides 57 of a respective holding element receptacle 55. The longitudinal sides 56 expediently extend in a straight line in parallel to the longitudinal extension L of the contact body 40. The longitudinal end sides 57 are, for example, round, straight, or the like.

The holding element receptacles 55 are provided, for example, at a distance from the end sides or longitudinal end sides 46 of the contact body 40. Further or differently arranged holding element receptacles can easily also be provided. For example, the holding element receptacles 55 do not necessarily have to extend in parallel to the longitudinal extension L, that is to say that the longitudinal sides 56 are parallel to the longitudinal extension L. It is also readily possible that, for example, the longitudinal sides 56 extend in parallel to the longitudinal end sides 46 of the contact body 40.

Starting from the upper side 43 of the contact body 40, the edges of the holding element receptacle 55 are inclined or have an inclined part 58. This facilitates, for example, the insertion of the respective holding element 60. For example, the inclined parts 58 extend like a funnel.

The upper side 43 of the contact body 40 and the inclined parts 58 form, for example, support contours 53 for the support projections 85.

When the holding element 60 is inserted into the holding element receptacle 55, it is supported with its longitudinal sides 66 on the longitudinal sides 56 of the holding element receptacle 55 and with its longitudinal end sides 67 on the longitudinal end sides 57 of the holding element receptacle 55.

The longitudinal sides 66 and the longitudinal end sides 67 or wall surfaces provided there form components of formfitting contours 90, using which the holding element 60 is supported in a formfitting manner on the holding element receptacle 55 having a directional component in parallel to the adhesive surface 71.

For the formfitting support of the holding element 60 on the holding element receptacle 55 having a directional component perpendicular to the adhesive surface 71, so that the contact body 40 is prevented from being removable from the work surface H when the adhesive element 60 adheres to the work surface H, rear engagement contours 91 are provided. The rear engagement contours 91 are supported on the upper side 43 of the contact body 40 or on support surfaces or rear engagement surfaces 95 of the contact body 40, which will be explained below. The rear engagement contours 91 are provided on support projections 85, more precisely their hook projections 87.

The holding element 60 has support projections 85 on its longitudinal sides 66. The support projections 85 are arranged adjacent to one another in a series arrangement. The support projections 85 include longitudinal legs 86 and hook projections 87. The longitudinal legs 86 include support surfaces 88 for formfitting support on the wall surface 59 of the contact body 40 extending on the inner circumference of the holding element receptacle 55. The wall surfaces 59 extend from the inclined part 58 to the contact surface 42 or the lower side of the contact body 40. The wall surfaces 59 are, for example, perpendicular to the contact surface 42. The hook projections 87 are beveled in their transition region to the support surface 88, so that they can bear in a formfitting manner against the inclined parts 58 of the holding element receptacle 55 on which the rear engagement surfaces 95 are provided.

It is preferred if the support projections 85, in particular their longitudinal legs 86, are resiliently yielding, so that the holding element 60 can be more or less clamped in the holding element receptacle 55, i.e., the holding element 60 can be clamped to the holding element receptacle 55.

It is also advantageous if a latching projection 89 is provided on the longitudinal leg 86 facing toward the wall surface 59, which can engage in a latching recess on the wall surface 59 (not shown in the drawing).

The latching projections or support projections 85 are advantageously in one piece with the carrier body 80 or formed by it.

The carrier body 80 is stiffer than the adhesive means 70, but still flexible. The carrier body 80 includes, for example, transverse reinforcing bodies 81 extending transversely to its longitudinal extension. The transverse reinforcing bodies 81 preferably extend between the support projections 85 and are designed, for example, as reinforcing ribs. The transverse reinforcing bodies 81 are arranged on an upper side 82 of the carrier body 80, the adhesive means 70 on its lower side 83. Thus, there are recesses 84 between the transverse reinforcing bodies 81, which allow a rolling movement or bending movement of the carrier body 80 and thus the holding element 60.

A positioning of the contact body 40 on the work surface H proceeds, for example, as follows:

First, the contact body 40 or the guide rail 41 is positioned on the work surface H at the desired location, so that its contact surface 42 bears on the work surface H in the desired position. The contact body 40 is then fixed to the work surface H using one or more holding elements 60, the adjustment of which between a positioning state PZ, for example shown in FIGS. 2 and 4, and an adhesive state HZ, for example shown in FIG. 6, can be implemented in various ways.

A possibility of installing the holding element 60 on the holding element receptacle 55 and thus the contact body 40 is given, for example, by first inserting a longitudinal end section 61 at a longitudinal end of a holding element 60 into the holding element receptacle 55, wherein the longitudinal end part 61 is supported on and/or bears against the longitudinal end sides 57 on the holding element receptacle 55. Between the longitudinal end section 61 and an adhesive part 63 of the holding element 60, on which the formfitting contours 90 are provided, in particular the support projections 85, the holding element 60 is, for example, flexible. For example, it can be pivoted in the context of a pivoting movement BS in the direction of the work surface H and therefore the contact surface 42 of the contact body 40, whereby the adhesive part 63 comes into contact with the work surface H and finally the holding element 60 is supported with its longitudinal end section 62, which is provided on the other longitudinal end of the adhesive element 60 opposite to the longitudinal end part 61, in a formfitting manner on the other longitudinal end of the holding element receptacle 55. The holding element 60 is then more or less pivoted and inserted into the holding element receptacle 55.

Furthermore, the recesses 84 in the carrier body 80 enable the holding element 60 to be rolled onto the work surface H in the context of a kind of rolling movement or winding movement. In this installation technique as well, the longitudinal end part 61, for example, is already received in the holding element receptacle 55 and is supported on a longitudinal end side 57 thereof when the adhesive part 63 is more or less rolled onto the work surface H, so that the adhesive surface 71 adheres to the work surface H.

Another possibility for fixing the holding element 60 on the work surface H is given, for example, by bringing the holding element 60 with its longitudinal end parts 61, 62 into contact on the longitudinal end sides 57 of the holding element receptacle 55, wherein the adhesive part 63 more or less initially arches away from the contact surface 62 and the work surface H, that is to say the adhesive surface 71 extends in an arch above the work surface H and thus does not adhere to it (see, for example, FIG. 5).

A pressing force BP then acts on the holding element 60, in particular its middle section or the adhesive part 63, i.e., a pressure is exerted on the upper side 82, so that the holding element 60 is deformed in the direction of the work surface H and the adhesive surface 71 adheres on the work surface H.

For example, an operator, in particular with a finger or a tool, presses with the pressing force BP on the upper side 82, which in this respect represents or includes an actuating handle 93, on the holding element 60 in order to adjust it from the positioning state PZ to the adhesive state HZ.

Furthermore, it is possible that the holding element 60 is partially or completely inserted into the holding element receptacle 55, but initially there is no contact of the adhesive surface 71 of the adhesive means 70 with the work surface H, i.e. there is a distance d between these two surfaces. For example, this is because when the holding element 60 is already inserted into the holding element receptacle 55, it is received in the holding element receptacle 55 so as to be displaceable in the direction of the contact surface 42 or the work surface H. By way of a pressing pressure or a pressing force BP on the upper side 82 of the holding element 60, the adhesive surface 71 is adjusted in the direction of the contact surface 42 or work surface H, so that the holding element 60 adheres to the work surface H. It is also possible that the holding element 60 is either flexible, as in the exemplary embodiment, or else is rigid, i.e., the carrier body 80, for example, does not have any recesses 84 and/or is rigid.

For example, the carrier body 80 has a reinforcement 92 indicated schematically. The reinforcement 92, for example a reinforcing rib, extends, for example, in the longitudinal direction of the carrier body 80. The carrier body 80 is preferably rigid transversely to a plug-in axis SB with which it can be inserted into the holding element receptacle 55 or plug-in receptacle 55A. In any case, the above-mentioned plug-in installation, in order to adjust the holding element 60 or the adhesive surface 71 from the positioning state PZ into the adhesive state HZ with respect to the holding element receptacle 55, is possible with rigid and flexible holding elements 60.

However, it is also possible that the flexible or rigid holding element 60, the carrier body of which includes, for example, the reinforcement 92 or is plate-shaped, as indicated in FIG. 2, can be pivoted around a pivot axis SC into the holding element receptacle 55 in order to bring it from the positioning state PZ to to the adhesive state HZ.

Furthermore, it is possible that latching contours or support contours 64 (shown schematically) are provided on the holding element 60, in particular on opposite sides of the holding element 60, which are supported on a buttress contour 58A, e.g. the inclined part 58, of the holding element receptacle 55 for holding the holding element 60 in the positioning state PZ and which are moved past the buttress contour 56A by the application of force using the pressing pressure or the pressing force BP in order to adjust the holding element 60 or the adhesive means 70 into the adhesive state HZ. For example, a latching projection protruding laterally in front of the outer circumferential contour of the carrier body 80 can be provided as a support contour 64 between the adhesive surface 71 and a hook projection 87, which in the positioning state PZ is supported on the inclined part 58 and thus the buttress contour 58A of the holding element receptacle 55 and then during further adjustment of the holding element 60 in the direction of the adhesive state HZ slides past the inclined part 58.

Instead of the holding element 60, however, a holding element 160 can also be arranged in the holding element receptacle 55. The holding element 160 and the contact body 40 form a system 10B.

The holding element 160 includes a carrier body 180 which, similar to the carrier body 80, has a series arrangement of support projections 85 on its longitudinal sides. The carrier body 180 can therefore also be inserted into the holding element receptacle 55, wherein its support projections 85 can be supported on the upper side 43 of the contact body 40. However, the holding element 160 has no adhesive means 70 (wherein this would readily be possible), but through openings 170, for example 3 through openings 170 through which nails or similar other fastening bolts were driven which penetrate the work surface H. The through openings 170 are arranged adjacent to one another in a series arrangement and extend, for example, in the region of a central holding part 163 of the holding element 160, the length of which corresponds approximately to the adhesive part 63. The through openings 170 extend from the upper side 82 to the lower side of the carrier body 180. Of course, they could also extend through an adhesive means, for example an adhesive layer, which can alternatively or additionally be arranged on the lower side of the carrier body 180.

In the case of a system 10C, a holding element 260 is detachably fastened on the above-explained contact body 40, i.e., the guide rail 41, which includes a carrier body 280 which basically corresponds to the carrier body 80. On its longitudinal sides, the carrier body 280 specifically includes the above-explained support projections 85 so that it can be supported in a formfitting manner on the holding element receptacle 55. The holding element 260 can therefore be inserted into the holding element receptacle 55 instead of the holding element 60 or 160 and is then supported on at least its longitudinal sides 266 on the longitudinal sides 56 of the holding element receptacle 55. It is advantageous if the longitudinal end parts 261, 262 of the holding element 260 are also supported on the longitudinal end sides 57 of the holding element receptacle 55.

Suction heads 271 are located as an adhesive means 270 on the lower side 83 of the carrier body 280. The suction heads 271 are arranged one behind the other or adjacent to one another, for example in rows extending in parallel to the longitudinal sides 66. The suction heads 271 are used for suction on the work surface H. When the holding element 260 is inserted into the holding element receptacle 55, namely from the upper side 43 of the contact body 40, the suction heads 271 come into adhesive or suction contact with the work surface H, so that they fix the guide rail 41 or the contact body 40 at least in one movement direction transverse to the work surface H.

Therefore, at least the support surfaces 88 of the carrier body 280 bear laterally against the wall surfaces 59 of the holding element receptacle 55. However, there are preferably hook projections 87 on the carrier body 280, which are supported on the upper side 43 of the contact body 40.

The carrier body 280, like the carrier body 80, is flexible and has, for example, recesses 84 between the support projections 85 which facilitate a winding movement or rolling movement. Transverse reinforcements (not shown in the drawing) like the transverse reinforcing bodies 81 can readily be provided on the carrier body 280.

Of course, holding elements like the holding elements 60, 160, 260 can be attached not only to rigid contact bodies or guide rails, but also, for example, to a flexible guide rail 141, which represents a contact body 140 of a system 100.

The guide rail 141 includes, for example, a contact surface 42 for bearing on or contacting the work surface H and an upper side 143 opposite to the contact surface 42, which is suitable as a sliding surface for the machine tool 20, for example. For their longitudinal guidance, profile contours 148 are arranged on the upper side 143, which implement the function of the guide contour 48, that is to say can engage in the guide receptacle 25 of the machine tool 20. The guide contours 48 are implemented, for example, by protruding or upstanding guide ribs in front of the upper side 143, which, unlike in the drawing, can certainly also have recesses or slots in the manner of the recesses 84 of the carrier body 80, so that winding or rolling of the contact body 140 onto roll 151 can take place more easily. The recesses extend, for example, from the free end regions of the guide contours 148 in the direction of the upper side 143.

The guide contours 148 extend in parallel to the longitudinal sides 144, 145 of the contact body 140. It is advantageous if the guide contours 148 furthermore extend from the one end side 146 to the other end side 146 of the contact body 40, that is to say over its entire longitudinal length.

The contact body 140 has arching bands or arching contours 147 designed in the manner of expanding bands, for example multiple arching contours 147 extending in parallel to its longitudinal extension. The arching contours 147 extend in parallel to the longitudinal sides 144, 145. The arching contours 147 lose their arch transverse to the longitudinal extension of the contact body 140 when the latter is wound up to form the roll 151. As a result, the roll 151 is stable.

Although the contact body 140 enables optimal longitudinal guidance on the machine tool 20, it is, however, comparatively thin and light, which can result in it slipping on the work surface H, even if a non-slip covering made of rubber or the like is provided on its lower side, the contact surface 42. Accordingly, it is advantageous if the contact body 140 also has one holding element receptacle 55 or multiple holding element receptacles 55 for one of the holding elements 60, 160, 260.

In the state installed on the respective contact body 40, 140, when they are accommodated in a respective holding element receptacle 55 and assume the positioning state PZ, the holding elements 60, 160, 260 do not protrude or only protrude far enough in front of a guide surface of the respective contact body 40, 140 that a longitudinal movement of the machine tool 20 or the guide element 21 along the longitudinal extension L is not obstructed. For example, the holding elements 60, 160, 260 are received in the holding element receptacles 55, but do not protrude opposite to the contact surface 42 in front of the guide surfaces 54A.

The holding elements 60, 160, 260 hold the contact body 40, 140 with a supporting force component SK oriented in the direction of the contact surface 42 in the sense of holding the contact body 40, 140 on the work surface H.

The holding elements 60, 160, 260 hold the contact body 40, 140 with a transverse force component SQ transverse to its longitudinal extension L and a transverse force component SQ2 parallel to its longitudinal extent L on the work surface H. The contact body 40, 140 is fixed against a shear movement transverse to the work surface H by the transverse force component SQ, SQ2. It is obvious that solely holding against shear forces, that is to say one or both of the transverse force components SQ, SQ2, can already be sufficient, that is to say that holding the respective contact body 40, 140 by the holding elements 60, 160, 260 with the supporting force component SK is advantageous, however it is not absolutely necessary. The fixing of the contact body 40, 140 with respect to the work surface H in parallel to the work surface H alone already represents a considerable advantage.

In the previous explanations, contact bodies were explained which are embodied as separate components from a machine tool or another object to be guided or supported. However, it is also possible that a contact body or guide body forms part of a machine tool, as will become clear hereinafter. In particular, it is advantageous to temporarily fix such a machine tool on the work surface to be machined by means of holding elements according to the invention, in order to enable optimal workpiece machining.

A machine tool 320 designed, for example, as a router includes, for example, a 1, contact body 340 in the form of a table or foot. The contact body 340 can be placed with its lower side, which forms a contact surface 342, on an underlying surface, for example the workpiece W. The contact body 340 has a machine bearing 346 on its upper side 343 facing away from the contact surface 342. A drive unit 322 is mounted on the machine bearing 348 in a longitudinally displaceable manner. The machine bearing 348 comprises, for example, multiple guide rods 349 which engage in guide receptacles 325 of the drive unit 322 in a longitudinally displaceable manner. The drive unit 322 includes a drive 323 for a work tool 324. The work tool 324 is, for example, a milling head, a drill, or the like. The drive unit 322 can, for example, be grasped by an operator using handles 326, 327 in order to adjust the work tool 324 in the direction toward the work surface H or away from it by means of the machine bearing 348 (corresponding to an arrow direction LH).

A holding element receptacle 55 is provided on the contact body 340. For example, the contact body 340 has a lateral section 344 on which the holding element receptacle 55 is provided. The operator can therefore first position the contact body 340 on the work surface H and then temporarily fix it using one of the holding elements 60, 160, 260 with respect to the work surface H for machining the work surface H or the workpiece W, for example by way of the above-explained installation methods of the holding element 60, 160, 260 on a contact body.

Further holding element receptacles like the holding element receptacle 55 can readily also be provided on the contact body 340 or a further section provided thereon like the section 344.

Longitudinal guides or insertion openings, in which one of the holder elements 60, 160, 260 is to be inserted with a movement direction in parallel to its adhesive surface 71, as in the exemplary embodiment explained hereinafter, can also be provided in a machine tool or its contact body or guide body.

The holding elements 60, 160, 260 can also be used on contact bodies that can be used independently of a machine tool, but can also be used in conjunction with a machine tool:

A contact body 440 includes, for example, a holding element receptacle 455. The holding element receptacle 455 is provided, for example, in the region of a contact surface 442 of the contact body 440.

The contact body 440 can be used, for example, with a manually actuatable tool, in particular a cutting tool. For example, the contact body 440 can be a guide ruler.

The contact body 440 includes a base leg 444, from which side legs 445, 446 protrude in a U-shape. The holding element receptacle 455 is provided on the base leg 444 on its lower side facing away from the side legs 445, 446. An upper side 443 of the base leg 444 extends between the side legs 445, 446 and thus more or less forms the bottom of a depression between the side legs 445, 446.

A support leg 447 projects laterally from the side leg 446. The support leg 447 and the base leg 444 preferably extend in parallel to one another. The side leg 446 and the support leg 447 are stepped with respect to the base leg 444.

The side leg 446 includes a support surface 448 on its side facing away from the base leg 444. The support leg 447 includes a support surface 449 on its side facing toward the side leg 446. The support surfaces 448, 449 are angled to one another. When the contact surface 442 bears against the work surface H, a receptacle is formed between the support leg 447 and the side leg 446, into which, for example, a workpiece W2 can engage, which is then supported on the contact body 440. The support leg 447 then forms, for example, a type of hold-down device. Instead of the workpiece W2, a further contact body, for example the contact body 340 of the machine tool 320, can of course also engage in the above-mentioned receptacle and/or be held by the contact body 340.

A side of the side leg 445 facing away from the base leg 444 can also be used as a support and, for example, provide a support surface 450.

Furthermore, a U-shaped receptacle delimited by the base leg 444 and the side legs 445, 446 can be used as a support receptacle.

The holding element receptacle 455 has wall surfaces 459 on its longitudinal sides, but is open at its longitudinal ends 457. A bottom 456 of the holding element receptacle 455 extends between the wall surfaces 459, on which the support projections 85 can be supported with their free ends, that is to say with their longitudinal ends that are farthest away from the lower side 83 of the carrier body 80. The hook projections 87 of the holding element 60 form guide projections which engage in guide receptacles 458 of the holding element receptacle 455. The guide receptacles 458 extend over the entire length of the holding element receptacle 455, that is from one longitudinal end 457 to the other longitudinal end 457, but could also be shorter. In any case, the guide receptacles 458, which extend from the bottom 456 of the holding element receptacle 455 into the wall surfaces 459, form undercuts or rear engagement surfaces or include rear engagement surfaces 495 on which the hook projections 87, which thus form rear engagement contours 491, are supported. The hook projections 87 then hold the contact body 440 with a supporting force component SK oriented in the direction of the contact surface 442 in the sense of holding the contact body 440 on the work surface H.

The assembly of the contact body 440 on the holding element 60 can be done, for example, in such a way that it is first adhesively bonded to the work surface H and then the contact body 440 is pushed with its longitudinal guide, the holding element receptacle 455, onto the holding element 60 in parallel to the work surface H or contact surface 442, approximately corresponding to a sliding axis SA.

However, it is also possible for the contact body 440 having the holding element 60 already received in the holding element receptacle 455 to be positioned on the work surface H, wherein initially the first adhesive surface 71 is still at a distance from the work surface H and remote from it. For example, by way of a play of the hook projections 87 in the guide receptacles 458, it is possible for the adhesive surface 71 to be brought into contact with the work surface H by pressing on the base leg 444 with a force or contact force BP, so that the contact body 440 is fixed on the work surface H.

The contact body 440 is also suitable for supporting a workpiece to be installed, for example, on a wall, i.e., as an installation aid, the contact body 440 is first fastened to the wall (i.e., the work surface H) and then the workpiece, for example a picture to be hung, can be supported on one of its support surfaces. Furthermore, other fastening contours can also be provided for a contact body according to the invention, for example a hook 401, which is shown schematically.

The concept of rear engagement contours and rear engagement surfaces as well as recesses that enable a holding element to be wound or rolled can also be implemented in other ways, which is made clearer by the exemplary embodiment explained hereinafter.

A schematically illustrated contact body 540 can be designed, for example, as a guide element of a machine tool or for a machine tool, similar to the contact body 40. The contact body 540 includes, for example, longitudinal sides 544, 545 which extend between its end sides 546. An upper side 543 of the contact body 540 can represent, for example, a sliding surface for a machine tool, a base for the machine bearing 348, or the like. On a lower side opposite to the upper side 543, a 3 contact surface 542 is provided for placing on the work surface H, for example. On the lower side or contact surface 542, anti-slip coverings or the like can be provided, wherein a firm hold on the work surface H preferably is implemented or can be implemented by a holding element 560.

In the area of the contact surface 542, the contact body 540 has a holding element receptacle 555 for a holding element 560. The holding element 560 includes a carrier body 580, on the lower side 583 of which an adhesive means 570 having an adhesive surface 571, for example an adhesive surface and/or suction surface corresponding to the adhesive means 70, 270, is provided so that the holding element 560 can adhere to the work surface H.

The holding element 560 can be inserted into the holding element receptacle 555 along a plug-in axis SA, that is to say it forms a plug-in body. The holding element receptacle 555 forms a longitudinal guide with respect to the plug-in axis SA for the holding element 560.

The holding element 560 includes support surfaces 588 on its longitudinal sides 566, which are suitable for flat contact on wall surfaces 559 of the holding element receptacle 555. The wall surfaces 559 and the support surfaces 588 extend transversely to the plug-in axis SA, preferably at right angles to the adhesive surface 571. The contact body 540 is thus supported on the holding element 560 with respect to forces transverse to the plug-in axis A and parallel to the adhesive surface 571 or to the contact surface 542.

Furthermore, the holding element 560 is supported with the upper side 582 of the carrier body 580 on the bottom 558 of the holding element receptacle 555.

Although the carrier body 580 itself has a block-like shape, it is still flexible. For this purpose, recesses 584 are provided on the carrier body 580, which extend transversely to the plug-in axis direction SA and thus enable the carrier body 580 to be bent in the sense of winding or rolling.

With regard to a force direction that extends at an angle to the adhesive surface 571 or contact surface 542, for example at right angles, support is provided by means of formfitting contours 590 which are designed as dovetail contours. For example, the carrier body 580 has a kind of dovetail positive contour on its upper side 582, namely a support projection 585 or a series arrangement of support projections 585 which extend in parallel to the plug-in axis SA, namely because the carrier body 580 is segmented due to the recesses 584.

The formfitting contours 590 or support projections 585 have rear engagement contours 591, namely inclined surfaces, which extend obliquely between the upper side 582 and an end side or upper side 586 of the respective support projection 585 parallel to the upper side 582. These can be brought into contact with rear engagement surfaces 595 in a formfitting receptacle 597 on the holding element receptacle 555. It is possible, but not necessary, for the upper top side 586 to bear against a bottom 596 of the formfitting receptacle 597. As a result of the engagement behind the rear engagement contours 591 using the rear engagement surfaces 595, the contact body 540 is held on the holding element 560 with a supporting force component SK in the sense of holding the contact body 540 on the work surface H.

The formfitting contours 590 can extend over the entire length of the holding element 560 between its longitudinal end sides 567, but also only over part of the length.

Similar to the contact body 540, a contact body 640 has a holding element receptacle 655 extending parallel to its longitudinal sides 644, 645. The holding element receptacle 655 has wall surfaces 659 extending in parallel to the longitudinal extension LE of the contact body 540 or in parallel to the longitudinal sides 644, 645, and also a bottom surface 658. A formfitting receptacle 597 can be present in the region of the bottom surface 658 so that, for example, a holding element like the holding element 560 can be held in the holding element receptacle 655 in a formfitting manner.

The holding element receptacle 655 can extend over the entire length of the contact body 640, i.e., between its longitudinal end sides 646. However, it is also possible that the holding element receptacle 655 (as well as the holding element receptacle 555) is designed in the manner of a blind hole, i.e., has a bottom or an end stop with respect to the plug-in axis SA.

The holding element receptacle 655 is used to receive holding elements 660 or 760. The holding elements 660, 760 include adhesive means 670, 770 having adhesive surfaces 671, 771, for example adhesive bonding surfaces. These adhesive surfaces 671, 771 can extend over the entire length of the respective holding element 660, 760, that is to say between the mutually opposite longitudinal end sides 667, 767, or also only over a part thereof.

On the longitudinal sides 666, 766 of the carrier bodies 680, 780 of the holding elements 660, 760, rear engagement contours 691, 791 are formed, for example, inclined surfaces that can be brought into engagement behind the inclined wall surfaces 659 of the holding element receptacle 655. The contact body 640 is thus held on the respective holding element 660, 760 with a supporting force component SK transverse to the plug-in axis SA.

For example, recesses 684, 784 can be provided on the carrier bodies 680, 780.

While the carrier body 680 is more or less a solid, block-like carrier body, the carrier body 780 includes a base leg 781 from which side legs and thus support projections 785 protrude laterally. The outer sides or outer surfaces facing away from the base leg 781 form the rear engagement contours 791.

The contact bodies 540 and 640 are preferably, at least in the region of their holding element receptacles 555, 655, flexible in such a way that by way of a pressing pressure BP acting on their upper side 543, 643 in the region of the holding element receptacles 555, 655 in the direction of the work surface H and/or of the contact surface 542, 642, they are deformable in such a way that the adhesive means 570, 670, 770 of the holding elements 560, 660, 760 are adjustable from a positioning state PZ, in which the adhesive means 570, 670, 770 and/or their adhesive surfaces 571, 671, 771 are set back behind the contact surface 542, 642 and/or have a distance to the work surface H, into the adhesive state HZ, in which the adhesive means 570, 670, 770 and/or their adhesive surfaces 571, 671, 771 are aligned with the contact surface 542, 642 or protrude in front of it and/or are in fixing or adhesive contact with the work surface H. The contact bodies 540 and 640 are flexible, for example due to their material, and/or have deformation recesses 547, 647, for example grooves, slots, or the like, which promote or facilitate the deformability or flexibility.

Like the contact body 40, a contact body 840 is designed as a guide rail 41. The basic embodiment of the contours of the guide rail 41, thus for example that of the profile body 50, the bearing elements 49, the guide projection 48A, and the guide contour 48, are the same for the contact body 840 as for the contact body 40.

Thus, when the contact body 840 bears against the work surface H, it can adhere to the work surface H in a frictionally-engaged manner, but can nevertheless be displaced along it. In order to enable the contact body 840 to be detachably held on the work surface H in this situation, holding elements 860, 960 are provided.

The holding elements 860 comprise, for example, holders 861 which can be connected in a detachable and formfitting manner to the contact body 840. For example, the holders 861 include a plate-shaped carrier 862, in particular, which can be connected to the contact body 840 by means of a clamping device 890. The clamping device 890 comprises a clamping body 891, which can, for example, be positioned in the receptacle 51 at various longitudinal positions with respect to the longitudinal extension L of the contact body 840. The clamping body 891 is designed, for example, in the manner of a slot nut which can be inserted into the grooved or slotted receptacle 51 and can be clamped in the receptacle 51 by means of a clamping screw 892. The holder 861 is then fixed on the contact body 840 in relation to the longitudinal extension L. Of course, the holder 861 and thus the holding element 860 can also be installed on the contact body 40 by means of the clamping device 890.

The carrier 862 has a bearing device 866, by means of which a carrier body 880 is pivotably mounted with respect to the carrier 862 and thus with respect to the contact body 840 around a pivot axis SW, in order to adjust an adhesive means 870 arranged on the carrier body 880 from a positioning state PZ, in which the contact body 840 is displaceable on the work surface H, apart from the frictional engagement between the bearing elements 49 and the work surface H, into an adhesive state HZ, in which the adhesive means 870 with its adhesive surface 871, which comprises an adhesive bonding surface or suction surface, for example, adheres to the work surface H and thus fixes the holding element 860 and ultimately the contact body 840 with respect to the work surface H.

The carrier body 880 is preferably plate-shaped and includes a bearing section 885 and a handle section 886, between which an adhesive part 863 is located. The bearing section 885 includes, for example, bearing projections or bearing blocks for the bearing device 866. The carrier body 880 can be grasped by an operator at the handle section 886.

Latching contours 887 for latching with latching counter contours 888 on the carrier 862 are provided on the handle section 886. When the positioning state PZ has been adjusted to the adhesive state HZ, the latching contours 887 can latch with the latching counter contours 888. It is possible that in this latching state the adhesive surface 861 provided on a lower side 883 of the carrier body 880 already comes into contact with the work surface H and thus fixes the carrier body 880 and ultimately the contact body 840 on the work surface H. However, it is also possible that in a position in which the carrier body 880 is already latched with the holder 861, there is still a distance between the adhesive surface 871 and the work surface H, i.e., that the adhesive surface 871 is still set back behind the contact surface 42 with respect to the work surface H. Due to a pressure or a pressing force BP on the upper side 882 of the carrier body 880, for example with a finger, the carrier body 880 arches in the direction of the contact surface 42 and thus in the direction of the work surface H, whereby the adhesive means 870 can come into contact with the work surface H.

The process of detaching the adhesive means 870 from the work surface H is simple, namely that the operator grasps the carrier body 880, which can also be referred to as a pivot body or a pivot layer, on the handle portion 886, whereby on so the one hand the latching contours 887 disengage from the latching counter-contours 888, on the other hand, however, the carrier body 880 more or less pulls the adhesive means 870 off of the work surface H in a peeling movement. It is possible here for the carrier body 880 to be deformable in a flexible manner in addition to the pivoting movement, so that gradually or sequentially various sections of the adhesive surface 971 are pulled off the work surface H.

Through openings 872 for nails, screws, on or similar other fastening bolts for direct fastening of the holder 861 to the work surface H are preferably also provided on the carrier 862.

The holding element 860, like the holding element 60, can be covered by a cover, for example as is the case with the holding elements 960A, 960B, and 960C explained below.

It is also possible for the adhesive means 970 used in the holding elements 960A and 960B to be used, for example, on the carrier 80 of the holding element 60.

The holding elements 960A, 960B can be adhesively bonded directly to the contact body 40, 140, or 840, for example adhesively bonded to the lower side 52 of the profile body 50, in particular in the spaces between the contact elements 49, where the contact surface 42 protrudes in front of the lower side 52 and thus a distance is present between the contact body 40, 840 and the work surface H when the contact body 40, 840 bears against the work surface H. The holding elements 960A, 9608 can also readily be used on the other contact bodies 340, 440, 540, 640 explained, for which the adhesive bonding surface 973 explained below is suitable.

The adhesive means 970 of the holding elements 960A, 960B are adhesive bonding on both sides. They have an adhesive surface 971 for adhesion to the work surface H and, on their opposite side, an adhesive bonding surface 973 for adhesive bonding to a further body, for example the contact body 40, 140, 840 directly or a carrier body 980A in the case of the holding element 960A. The adhesive means 970 of the holding element 960A could also be adhesively bonded directly to the lower side 52 of the contact body 40, 840, however.

The carrier body 980A can be inserted into holding element receptacles 855A of the contact body 840 in a formfitting manner. Its narrow sides correspond to the support surfaces 88 of the carrier body 80 and accordingly bear against the wall surfaces of the holding element receptacle 855A when the carrier body 980A is inserted into the holding element receptacle 855A, which is designed more or less as a plug-in receptacle. In particular, the longitudinal sides 966 of the carrier body 980A bear in a formfitting manner on the inner longitudinal sides of the holding element receptacle 855A. Furthermore, the longitudinal end sides 967 of the carrier body 980A bear in a formfitting manner on the longitudinal end sides or longitudinal end regions of the holding element receptacle 855. The contact body 840 is thus supported with its holding element receptacle 855A in force directions parallel to the contact surface 42 or adhesive surface 971 on the carrier body 980A and thus the holding element 960A.

In the longitudinal end regions of the carrier body 980A, however, there are recesses 981 through which an actuating section 992 of a cover 990A of the holding element 960A and a handling section 972 of the adhesive means 970 protrude from the lower side 983 to the upper side 982 of the carrier body 980A and can be grasped by an operator.

In principle, however, it is also possible that the carrier body 980A is shorter than a longitudinal extension of the holding element receptacles 855A, so that recesses 856A are present in their longitudinal end regions, through which the actuating section 992 and/or the handling section 972 can protrude from the lower side of the contact body 40 to its upper side 43.

In the case of the holding element 960B, the adhesive means 970 itself more or less forms its carrier body 980B. The adhesive bond 973 can be implemented directly with the contact body 40, 840.

The holding element 9608B is preferably adhesively bonded to the contact body 40, 840 in such a way that its handling section 972 and actuating section 992 protrude laterally in front of the contact body 40, 840 or protrudes through a recess 8568 from the lower side to the upper side 43 of the contact body 40, 840. The recess 856B is preferably designed in the manner of a window and/or, for example, as a through opening which extends from the lower side to the upper side 43 of the contact body 40, 840.

A height of the holding elements 960A, 960B in the state fastened to the contact body 40, 840 is preferably dimensioned such that an adhesive surface 971 of their adhesive means 970 is approximately flush with the contact surface 42 of the contact body 40, 840.

In the positioning state PZ, the adhesive surface 971 is covered by a cover section 991 of the cover 990A, 990B of the holding element 960A, 960B. The cover 990A, 990B is preferably film-like and can more or less be pulled off the adhesive surface 971, so that the adhesive surface 971 and therefore the holding element 960A, 960B can be transferred from the positioning state PZ to the holding state or adhesive state HZ.

An actuating section 992, the free end region of which forms the handle section 994, is articulated to the cover section 991 via a deflection section 993. In the manner of a peeling movement, the cover 990A, 9908 can now be more or less pulled off or set aside from the adhesive surface 971 by a pulling actuation of the handle section 994 (shown by arrows in FIGS. 27 and 29). As a result, the adhesive surface 971 comes free and can adhere to the work surface H.

It is possible that after the cover 990A, 990B has been removed, there is still a distance between the adhesive surface 971 and the work surface H. The adhesive surface 971 can be brought into adhesive contact with the work surface H by a corresponding pressure actuation using a pressing force BP, for example on the carrier body 980A or that section of the contact body 40, 840 where the holding element 960A, 960B is arranged.

The removal of the holding element 960A, 9608B from the adhesive state HZ is also readily possible when the contact body 40, 840 bears on the work surface H. This is because the adhesive means 970 has the handling section 972 which can be grasped by an operator in order to stretch the adhesive means 970, whereby the adhesion of the adhesive surface 871 to the work surface H forming a contact surface is released, thus the holding element 960A, 960B is more or less detached from the work surface H. The contact body 40, 840 can then be moved freely again relative to the work surface H.

In the case of the holding element 960A, the handling section 972 and the actuating section 992 are arranged at mutually opposite longitudinal end regions, in the case of the holding element 960B at the same longitudinal end region. It is advantageous if the actuating section 992 of the cover 990B protrudes in front of the handling section 972 so that it can be more easily grasped. This is due to the fact that the cover 990B must first be removed by means of the actuating section 992 before the holding element 960B is subsequently more or less inactivated by actuating the handling section 972.

The invention claimed is:

1. A device for supporting and/or guiding a machine tool or a tool or a workpiece, wherein the device comprises:
   a contact body having a contact surface for abutment against a work surface of a workpiece or a wall, and
   a holding element releasably held by the contact body,
   wherein the holding element has an adhesive for adhesion to the work surface, and
   wherein, when the contact surface of the contact body already abuts against the work surface, the adhesive is displacable from a positioning state into an adhesive state, and
   wherein the adhesive is not in contact with the work surface when the adhesive is in the positioning state such that the contact surface of the contact body is positionable with respect to the work surface, and
   wherein the adhesive adheres to the work surface when the adhesive is in the adhesive state such that the contact body is immovable with respect to the holding element and the holding element fixes the contact body on the work surface.

2. The device as claimed in claim 1, wherein the adhesive comprises an adhesive bonding surface for adhesive bonding to the work surface.

3. The device as claimed in claim 1, wherein the contact body has a holding element receptacle for receiving the holding element, the holding element receptacle having an inner peripheral contour substantially matching an outer peripheral contour of the holding element.

4. The device as claimed in claim 1, further comprising a bearing device for movably mounting the holding element between the positioning state and the adhesive state and/or for a relative positioning of the holding element and the contact body.

5. The device as claimed in claim 4, wherein the holding element is pivotably mounted on the bearing device to pivot the adhesive towards the contact surface into the adhesive state and/or away from the contact surface for detaching the adhesive from the work surface.

6. The device as claimed in claim 4, wherein the bearing device comprises a sliding bearing on which the holding element is mounted so as to be displaceable towards the contact surface in such a way that an adhesive surface of the adhesive is displaceable in parallel to the contact surface.

7. The device as claimed in claim 1, wherein the holding element is flexible for an adjustment between the positioning state and the adhesive state.

8. The device as claimed in claim 1, wherein the holding element, in a supporting state in which the holding element is supported at least partially on the contact body, is deformable from the positioning state to the adhesive state.

9. The device as claimed in claim 1, wherein the holding element is flexible for rolling up or unwinding the adhesive in the direction toward the work surface and/or for winding or rolling up or peeling off of the adhesive away from the work surface.

10. The device as claimed in claim 1, wherein the holding element, transversely to the holding element's longitudinal extension or transversely to a rolling direction provided for winding or rolling the holding element, includes at least one recess and/or at least one transverse reinforcing body.

11. The device as claimed in claim 1, wherein the holding element is detachably held on the contact body by means of a fastening means.

12. The device as claimed in claim 11, wherein the fastening means comprises at least one rear engagement surface for the holding element.

13. The device as claimed in claim 11, wherein the fastening means comprises at least one contour on the holding element and a contour provided on a holding element receptacle of the contact body, wherein the at least one contour of the holding element substantially matches the contour provided on the holding element receptacle for holding the holding element on the holding element receptacle of the contact body.

14. The device as claimed in claim 13, wherein the contour on the holding element includes at least one rear engagement contour for engaging behind at least one rear engagement surface of the holding element receptacle of the contact body, wherein the rear engagement contour supports the rear engagement surface of the contact body, when the rear engagement surface of the contact body bears against the rear engagement contour, with at least one supporting force component oriented in the direction of the contact surface for holding the contact body on the work surface.

15. The device as claimed in claim 14, wherein the at least one rear engagement contour comprises at least one support projection and/or at least one hook.

16. The device as claimed in claim 13, wherein the holding element receptacle comprises a window which extends between the contact surface and an upper side of the contact body opposite to the contact surface.

17. The device as claimed in claim 13, wherein the holding element receptacle includes a longitudinal guide for guiding the holding element along a longitudinal axis which extends in parallel to the contact surface.

18. The device as claimed in claim 1, wherein the holding element includes at least one support projection extending transversely to a longitudinal extent of an adhesive surface of the adhesive for supporting on a support contour of the contact body.

19. The device as claimed claim 18, wherein the contact body includes an upper side opposite to the contact surface, the upper side of the contact body forming the support contour wherein the support contour forms a guide receptacle of a linear guide and the at least one support projection forms a guide projection for engaging the guide receptacle for linearly guiding the holding element on the contact body.

20. The device as claimed in claim 1, wherein the holding element includes at least one support surface which is angled with respect to an adhesive surface of the adhesive for supporting the contact body against forces acting in parallel to the contact surface.

21. The device as claimed in claim 20, wherein the at least one support surface comprises support surfaces provided on opposite sides of the holding element wherein the support surfaces support the holding element with respect to forces acting in parallel to the contact surface on the contact body.

22. The device as claimed in claim 11 wherein the fastening means has a latching arrangement for latching the holding element with the contact body.

23. The device as claimed in claim 22, wherein the latching arrangement includes at least one latching contour for latching the holding element with the contact body, wherein the latching contour includes a sliding surface or is arranged on a sliding surface, using which the holding element is slide-displaceably mounted on the contact body between the positioning state and the adhesive state.

24. The device as claimed in claim 22, wherein the adhesive is arranged on opposite sides of the holding element.

25. The device as claimed in claim 1, wherein the adhesive, is covered by a cover which is removable from the adhesive to bring it into the adhesive state.

26. The device as claimed in claim 25, wherein the cover is film-like and/or flat and/or wherein the cover comprises a cover film and/or wherein the cover completely covers the adhesive.

27. The device as claimed in claim 25, wherein the cover includes a cover section covering the adhesive and an actuating section, which can be manually actuated by an operator in the positioning state, and by means of which the cover section can be removed from the adhesive and brought into the adhesive state.

28. The device as claimed in claim 27, wherein, in the positioning state, at least part of the actuating section bears against the cover section and/or the cover includes at least one deflection section between the actuating section and the cover section.

29. The device as claimed in claim 27, wherein the handle section of the cover element protrudes laterally in front of the contact body and/or through a recess in the contact body for grasping by the operator when the holding element is arranged or fastened on the contact body.

30. The device as claimed in claim 1, wherein an adhesive body of the holding element carrying or forming the adhesive has a handling section which can be manually actuated, by an operator in the adhesive state, by means of which the adhesive body can be actuated to bring the adhesive from the adhesive state into a release state removed from the work surface of the workpiece.

31. The device as claimed in claim 30, wherein the adhesive means-extends along a longitudinal axis of the adhesive body and the adhesive body can be stretched in the direction of its longitudinal axis by a pulling actuation of the handling section to release the adhesive from the work surface.

32. The device as claimed in claim 30, wherein the handling section of the adhesive body protrudes laterally in front of the contact body and/or through a recess in the contact body for grasping by the operator when the holding element is arranged or fastened on the contact body.

33. The device as claimed in claim 30, wherein the handle section of the cover element and the handling section of the adhesive body are arranged on opposite sides of the holding element or on the same side.

34. The device as claimed in claim 1, wherein the holding element includes at least one through opening for a fastening bolt.

35. The device as claimed in claim 1, wherein the contact body forms a guide body, for the machine tool, and includes at least one guide contour extending along a longitudinal extension of the guide body.

36. The device as claimed in claim 1, wherein the guide body forms a guide rail, the lower side of which includes or forms the contact surface of the contact body and the upper side of which includes a sliding surface for displacing the machine tool.

37. The device as claimed in claim 1, wherein the holding element includes an actuating handle for manually positioning the holding element from the positioning state into the adhesive state.

38. The device as claimed in claim 37, wherein the actuating handle protrudes laterally in front of the contact body or is accessible for the operating actuation from a side of the contact body facing away when the holding element is arranged on the contact body.

39. The device as claimed in claim 1, wherein the holding element is supported in the holding element receptacle with at least one supporting force component parallel to the contact surface.

40. The device as claimed in claim 1, wherein the holding element includes at least one support contour for supporting the holding element on a buttress contour of the holding element receptacle in the positioning state, wherein the support contour is movable past the buttress contour of the holding element receptacle for adjusting the holding element in the direction of the adhesive state.

41. The device as claimed in claim 1, wherein the holding element receptacle has a shape configured for plugging in the holding element.

42. The device as claimed in claim 41, wherein the holding receptacle extends from an upper side of the contact body opposite to the contact surface to the contact surface and/or is open on the upper side of the contact body.

43. The device as claimed in claim 1, wherein the contact body is plate-like and/or is or comprises a guide rail and/or includes at least one elongated guide contour.

44. The device as claimed in claim 1, wherein the holding element has a shape configured for preventing the holding element from protruding beyond a guide surface or support surface of the contact body on which the tool or the machine tool is guided or supported on the contact body such that the machine tool or the tool is guidable over the holding element received in the holding element receptacle.

45. The device as claimed in claim 1, wherein the device forms part of a system which comprises the machine tool and/or the tool.

46. A device for supporting and/or guiding a machine tool or a tool or a workpiece, wherein the device comprises:

a contact body having a contact surface for abutment against a work surface of a workpiece or a wall, and a holding element releasably held by the contact body, wherein the holding element has an adhesive for adhesion to the work surface, and wherein, when the contact surface of the contact body already abuts against the work surface, the adhesive is displacable from a positioning state into an adhesive state, and wherein the adhesive is not in contact with the work surface when the adhesive is in the positioning state such that the contact surface of the contact body is positionable with respect to the work surface, and wherein the adhesive adheres to the work surface when the adhesive is in the adhesive state such that the contact body is immovable with respect to the holding element and the holding element fixes the contact body on the work surface, and wherein the holding element is detachably held on the contact body by means of a fastening means, the fastening means comprising at least one contour on the holding element and a contour provided on a holding element receptacle of the contact body, wherein the at least one contour of the holding element substantially matches the contour provided on the holding element receptacle for holding the holding element within the holding element receptacle of the contact body, and wherein the contour provided on the holding element receptacle defines a window having two opposite longitudinal sides extending between two ends, the window extending between the contact surface and an upper side of the contact body opposite to the contact surface.

47. The device as claimed in claim 46, wherein opposite longitudinal ends of the holding element are held by the two ends of the holding element receptacle window when the adhesive is in the positioning state such that the holding element has a curved shape between the opposite longitudinal ends and the adhesive is not in the plane of the contact surface of the contact body, and wherein the adhesive is in the same plane as the contact surface of the contact body when the adhesive is in the adhesive state.

48. A device for supporting and/or guiding a machine tool or a tool or a workpiece, wherein the device comprises:

a contact body having a contact surface for abutment against a work surface of a workpiece or a wall, and a holding element releasably held by the contact body, wherein the holding element has an adhesive for adhesion to the work surface, and wherein, when the contact surface of the contact body already abuts against the work surface, the adhesive is displacable from a positioning state into an adhesive state, and wherein the adhesive is not in contact with the work surface when the adhesive is in the positioning state such that the contact surface of the contact body is positionable with respect to the work surface, and wherein the adhesive adheres to the work surface when the adhesive is in the adhesive state such that the contact body is immovable with respect to the holding element and the holding element fixes the contact body on the work surface, and wherein the holding element is flexible for rolling up or unwinding the adhesive in the direction toward the work surface and/or for winding or rolling up or peeling off of the adhesive away from the work surface while the contact surface of the contact body bears against the work surface.

49. A method for releasably attaching a tool guide to a workpiece, the method comprising:

abuting a contact surface of a contact body of the tool guide against a work surface of a workpiece;

inserting a holding element into a holding element receptacle of the contact body; and displacing an adhesive of the holding element from a positioning state into an adhesive state while the contact surface of the contact body already abuts against the work surface, wherein the adhesive is not in contact with the work surface when the adhesive is in the positioning state such that the contact surface of the contact body is positionable with respect to the work surface, and wherein the adhesive adheres to the work surface when the adhesive is in the adhesive state such that the contact body is immovable with respect to the holding element and the holding element releasably attaches the contact body on the work surface.

\* \* \* \* \*